(12) United States Patent
Zweifel et al.

(10) Patent No.: US 7,765,538 B2
(45) Date of Patent: Jul. 27, 2010

(54) METHOD AND APPARATUS FOR DETERMINING WHICH PROGRAM PATCHES TO RECOMMEND FOR INSTALLATION

(75) Inventors: Evan Rudolph Zweifel, Fort Collins, CO (US); Robert Carl Devereaux, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1671 days.

(21) Appl. No.: 10/977,694

(22) Filed: Oct. 29, 2004

(65) Prior Publication Data

US 2006/0101457 A1   May 11, 2006

(51) Int. Cl.
G06F 9/44 (2006.01)
G06F 9/445 (2006.01)

(52) U.S. Cl. ................ 717/168; 717/169; 717/174; 717/175

(58) Field of Classification Search ............ 717/169, 717/175
See application file for complete search history.

(56) References Cited

U.S. PATENT DOCUMENTS

| | | | |
|---|---|---|---|
| 6,289,509 B1 | 9/2001 | Kryloff | |
| 6,363,524 B1 | 3/2002 | Loy | |
| 6,477,703 B1 | 11/2002 | Smith | |
| 6,493,871 B1 | 12/2002 | McGuire | |
| 6,526,574 B1 | 2/2003 | Jones | |
| 7,020,875 B2 * | 3/2006 | Zweifel et al. | 717/168 |
| 7,451,440 B2 * | 11/2008 | Zweifel | 717/168 |
| 7,506,338 B2 * | 3/2009 | Alpern et al. | 717/177 |
| 7,536,687 B1 * | 5/2009 | Myers | 717/174 |
| 2002/0174422 A1 * | 11/2002 | Kelley et al. | 717/178 |
| 2003/0033313 A1 * | 2/2003 | Zweifel et al. | 707/100 |
| 2003/0033597 A1 | 2/2003 | Allsop | |
| 2004/0205709 A1 * | 10/2004 | Hiltgen et al. | 717/115 |
| 2004/0210653 A1 * | 10/2004 | Kanoor et al. | 709/223 |
| 2005/0257214 A1 * | 11/2005 | Moshir et al. | 717/171 |
| 2006/0080653 A1 * | 4/2006 | Siwatu et al. | 717/173 |
| 2006/0080656 A1 * | 4/2006 | Cain et al. | 717/174 |

* cited by examiner

Primary Examiner—Insun Kang

(57) ABSTRACT

A method and system for selecting patches to recommend for installation on a given computer system. The method, for example, comprises selecting one or more patch analyzer programs from a collection of such programs and then executing each selected program, causing it to generate issues by processing a set of patches compatible with the selected program and with the computer system's installed operating system, programs, and patches. Goals are then identified for as many of these issues as practicable, each goal calling for the installation of a patch or one of its successors. Mutually consistent patch installation recommendations are then generated that satisfy as many of the goals as possible and that also satisfy any dependencies of any recommended patch on the prior installation of other patches, guided by patch attributes and successor relationships.

36 Claims, 11 Drawing Sheets

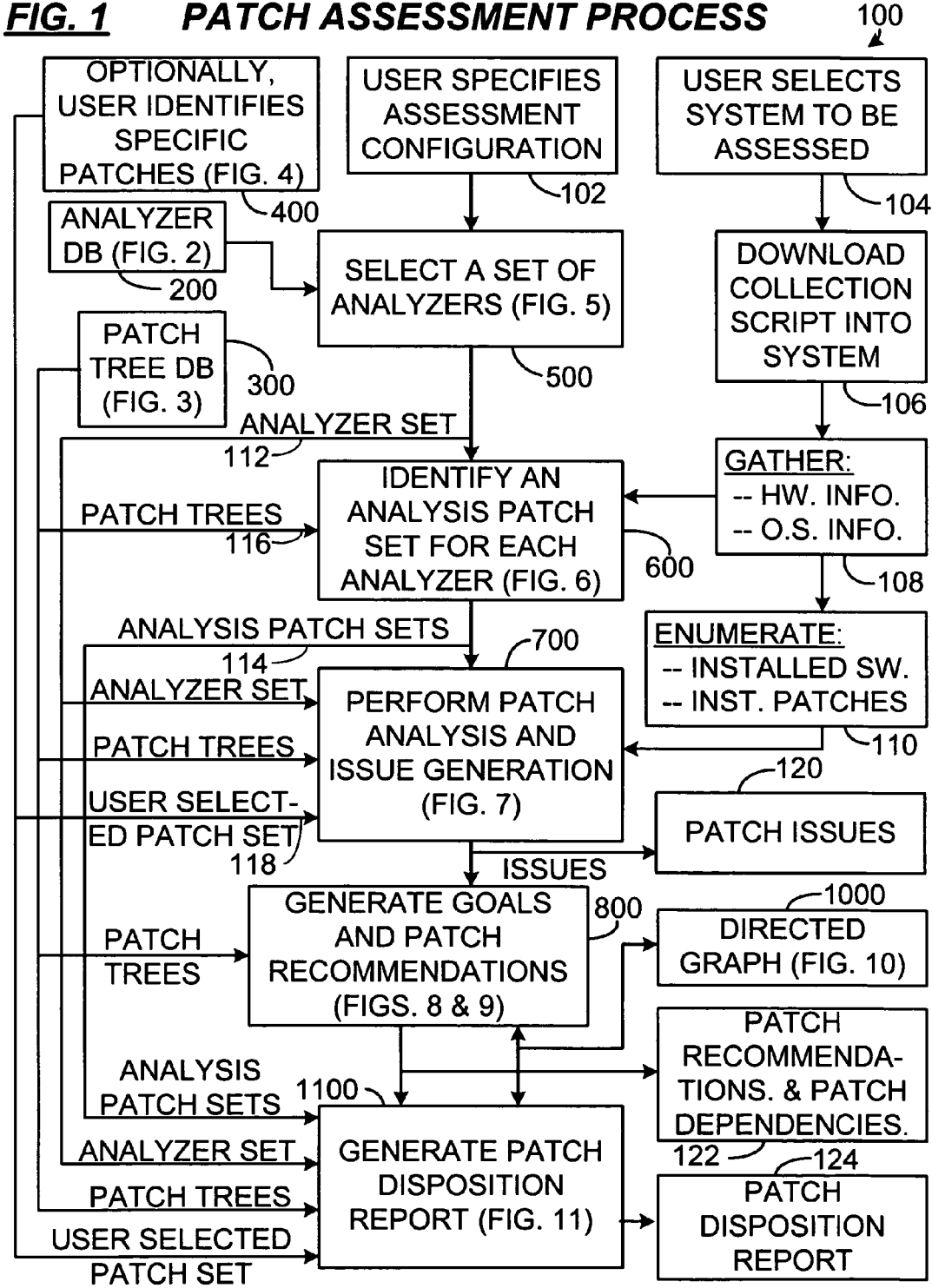

FIG. 2    ANALYZER DATABASE    ⟵200

CandidatePatchAnalyzer — 202

Identify all recommended patches which will currently install on the system. Issues: InstalledHasSuperseded(i,p)) & CandidateNotInstalled(p).

CritcalPatchAnalyzer — 206

Identify all critical patches which are not installed and have no successor installed on the system. Issues: MissingCriticalPatch(p).

ExplicitPatchAnalyzer — 210

Identify all patches explicity requested which are not installed and have no successor installed on the system. Issues: InstalledSupersedesExplicit(i,p) & MissingExplicitPatch(p).

IPatchPatchAnalyzer — 214

Identify all patches required to run a particular application, which are not installed and have no successor installed on the system. Issues: InstalledMissingPatchFromSet(app,p).

InstalledPatchAnalyzer — 218

Indentify patches installed on system which are unrecognized or unexpectedly missing patches they depend upon. Issues: InstalledUnrecognized(p) & InstalledMissingDependentIssue(p,d).

SecurityPatchAnalyzer — 222

Identify all security patches which are not installed and have no successor installed on the system. Issues: InstalledMissingSecurityPatch(p).

SystemAnalyzer — 226

Determine if the latest version of the system information collector is being used. Issues: OldCollectionIssue.

WarningPatchAnalyzer — 230

Identify all patches currently installed on the system which have warnings issued against the patch. Issues: WarningPatch(p).

FIG. 3    PATCH TREE DATABASE
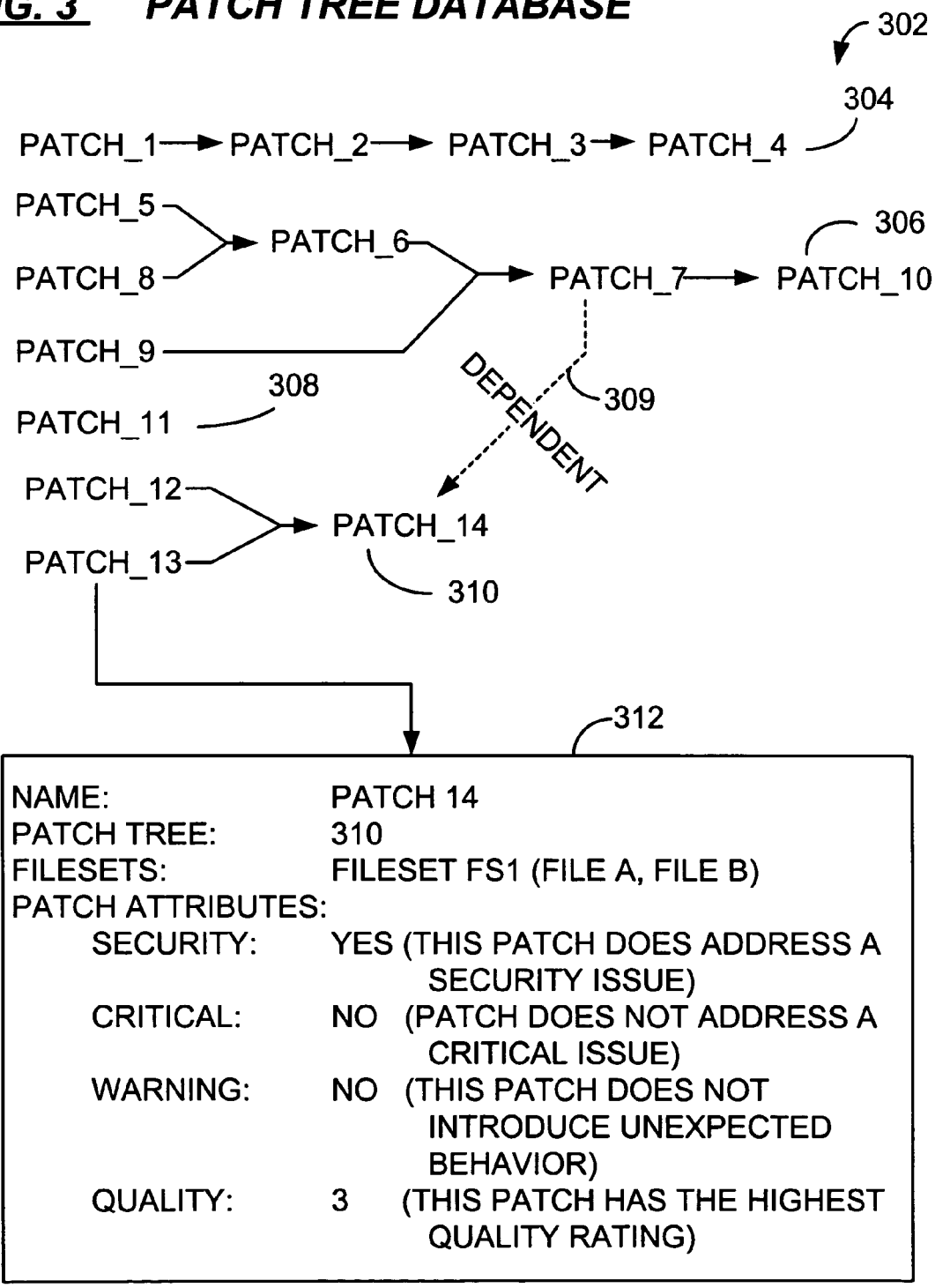

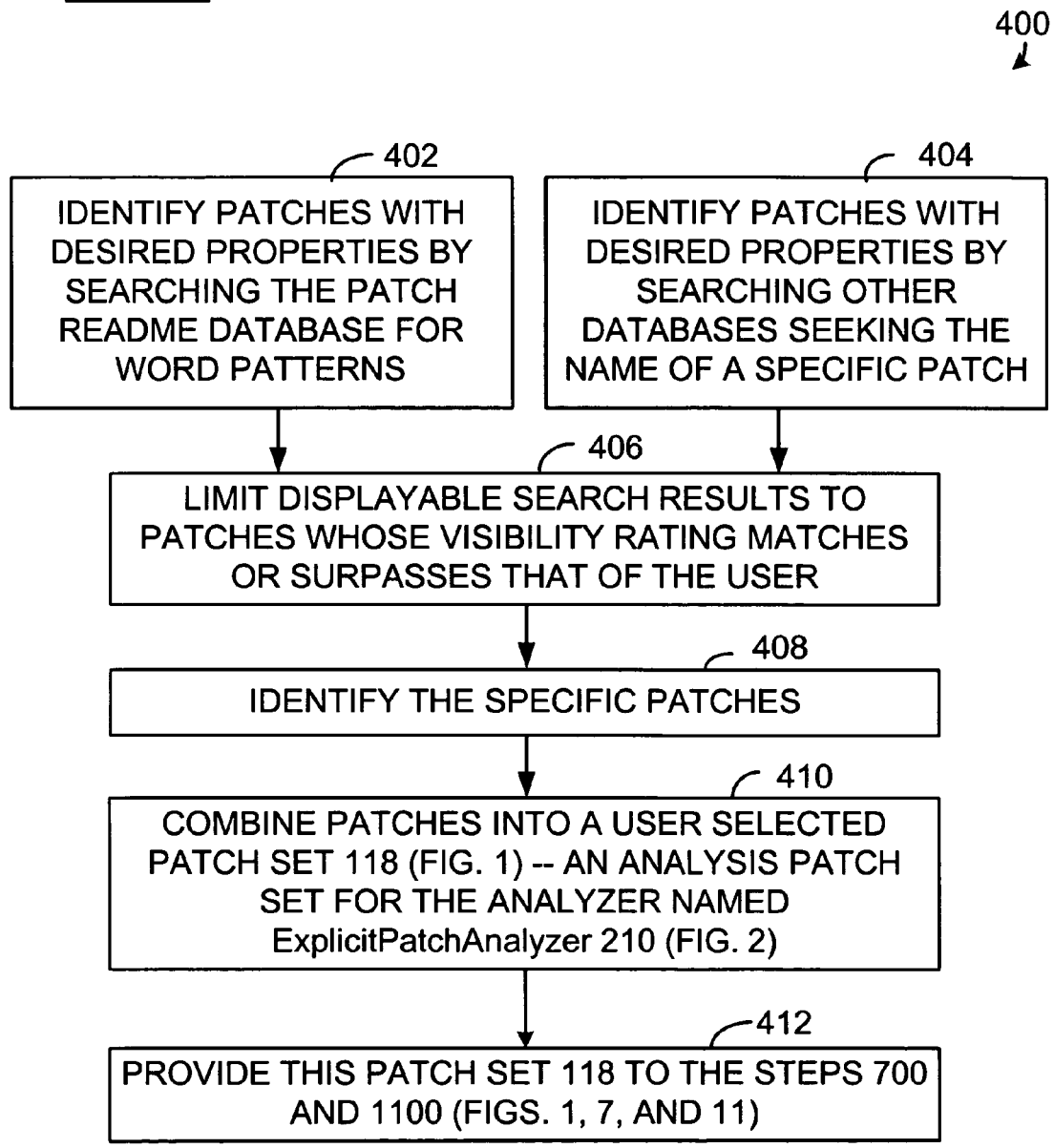
FIG. 4  USER IDENTIFIES SPECIFIC PATCHES

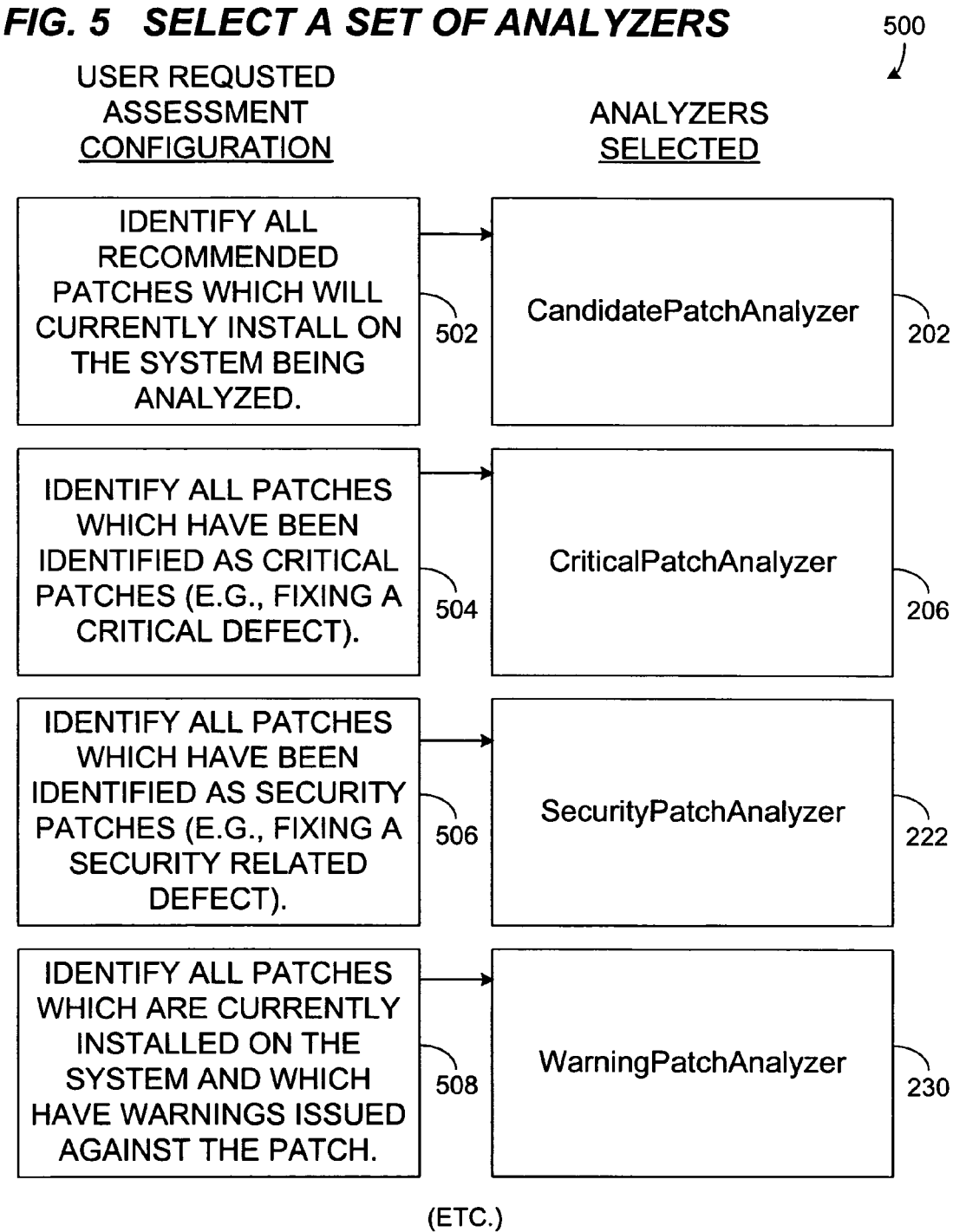
FIG. 5 SELECT A SET OF ANALYZERS

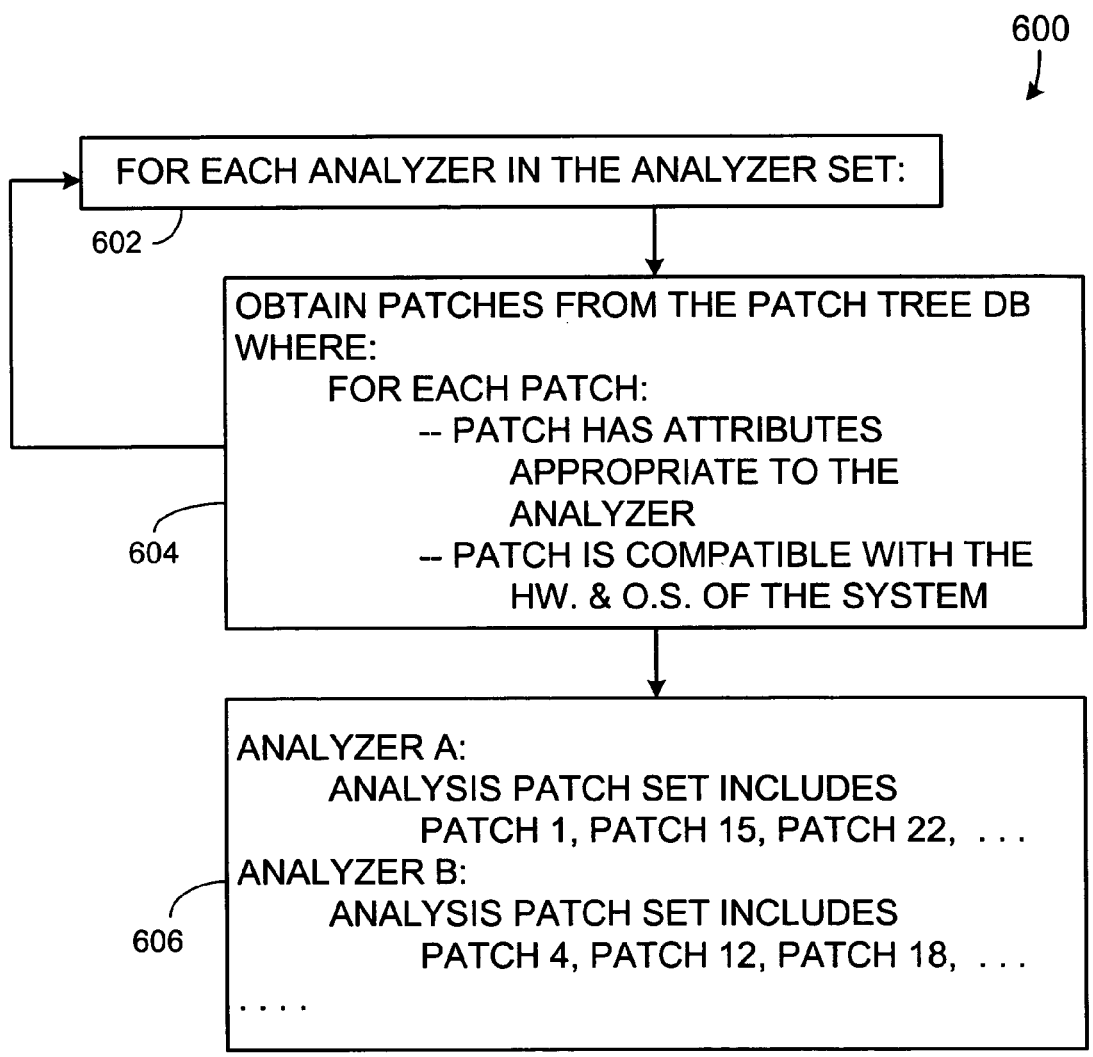

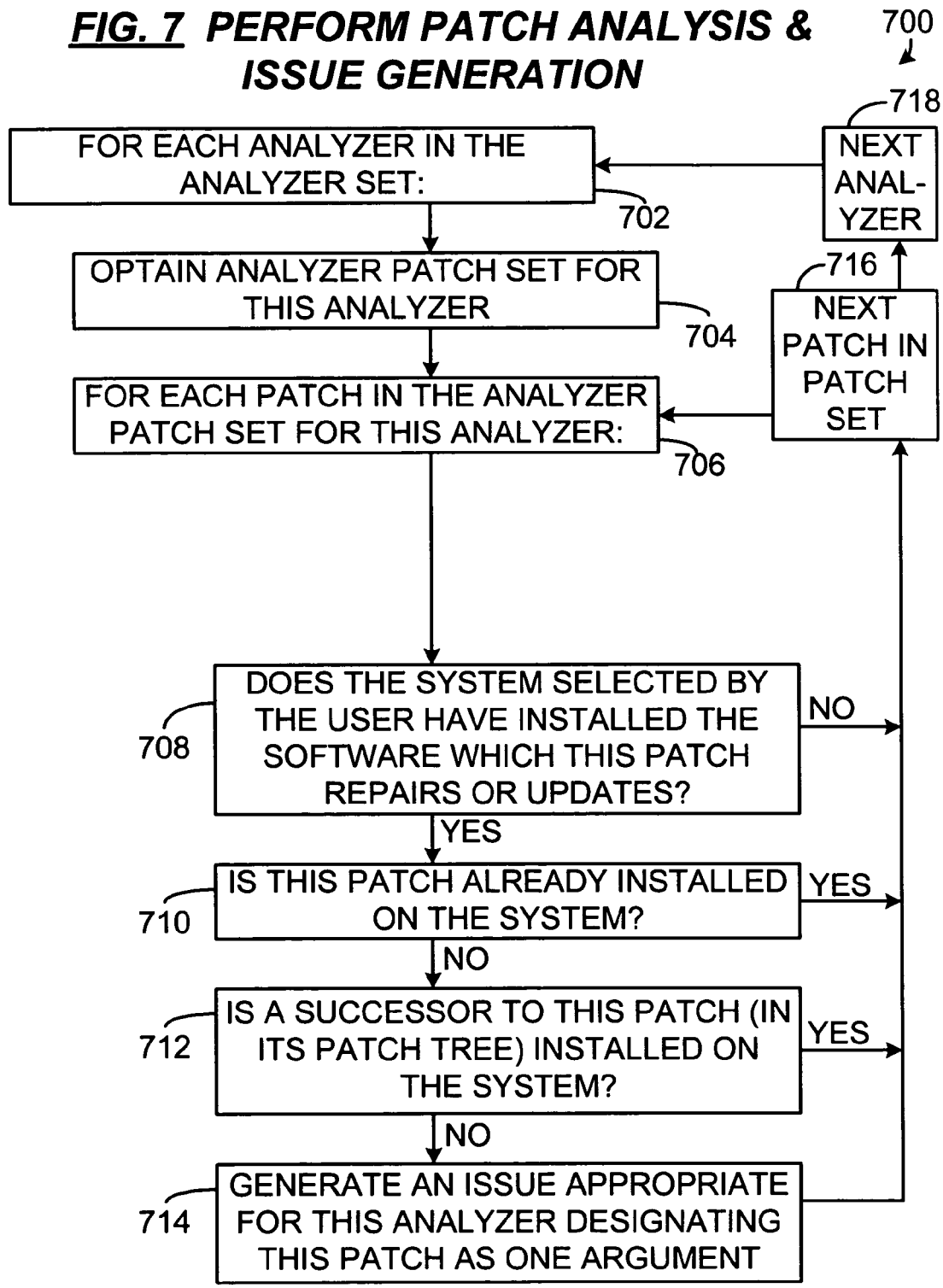

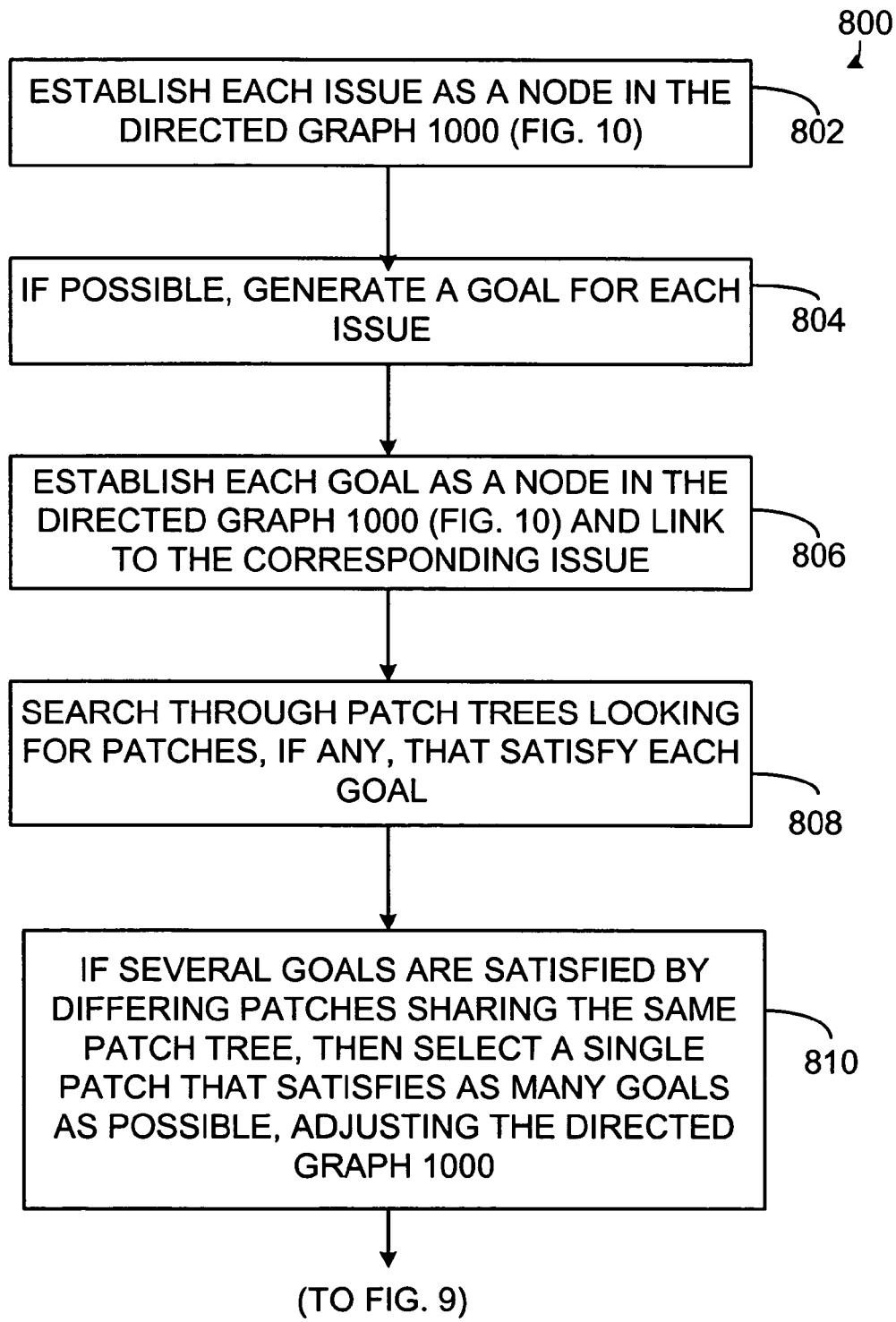

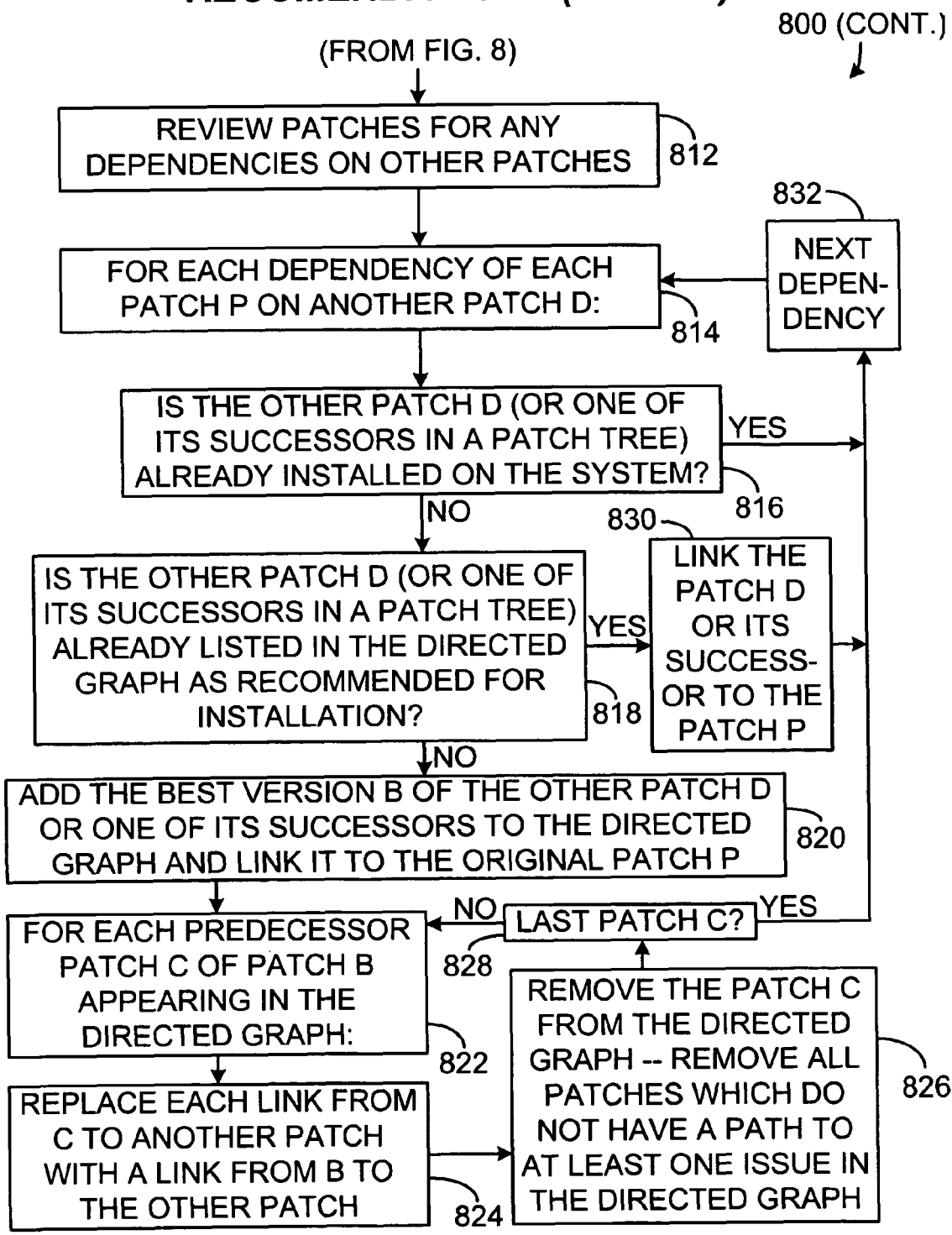

FIG. 10 DIRECTED GRAPH (EXAMPLES)
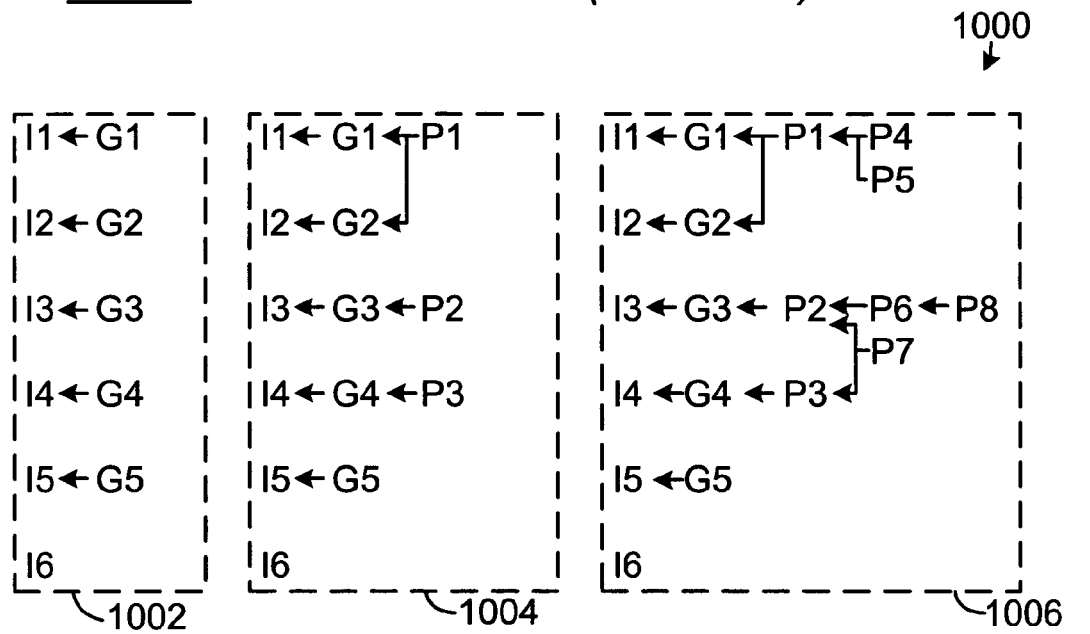
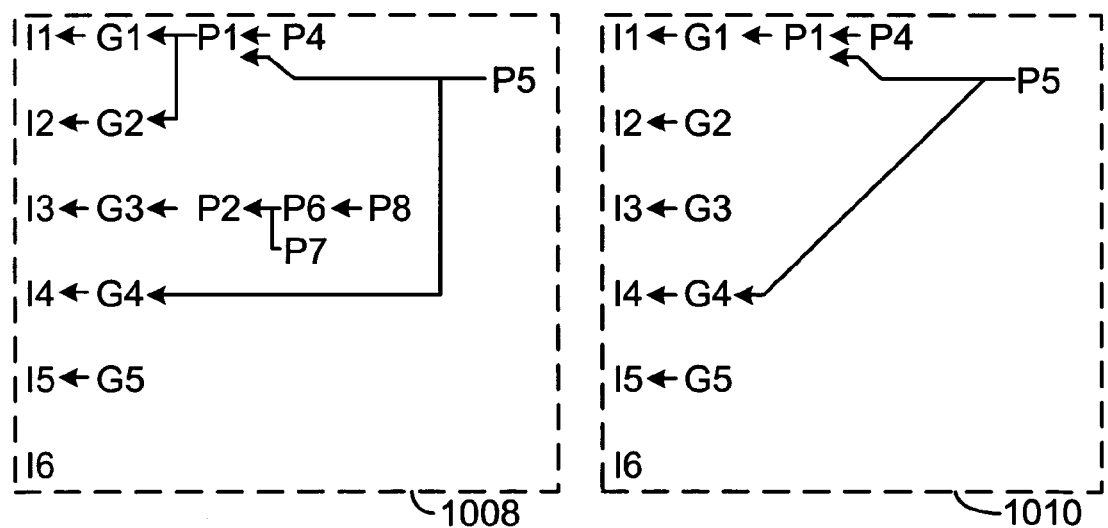

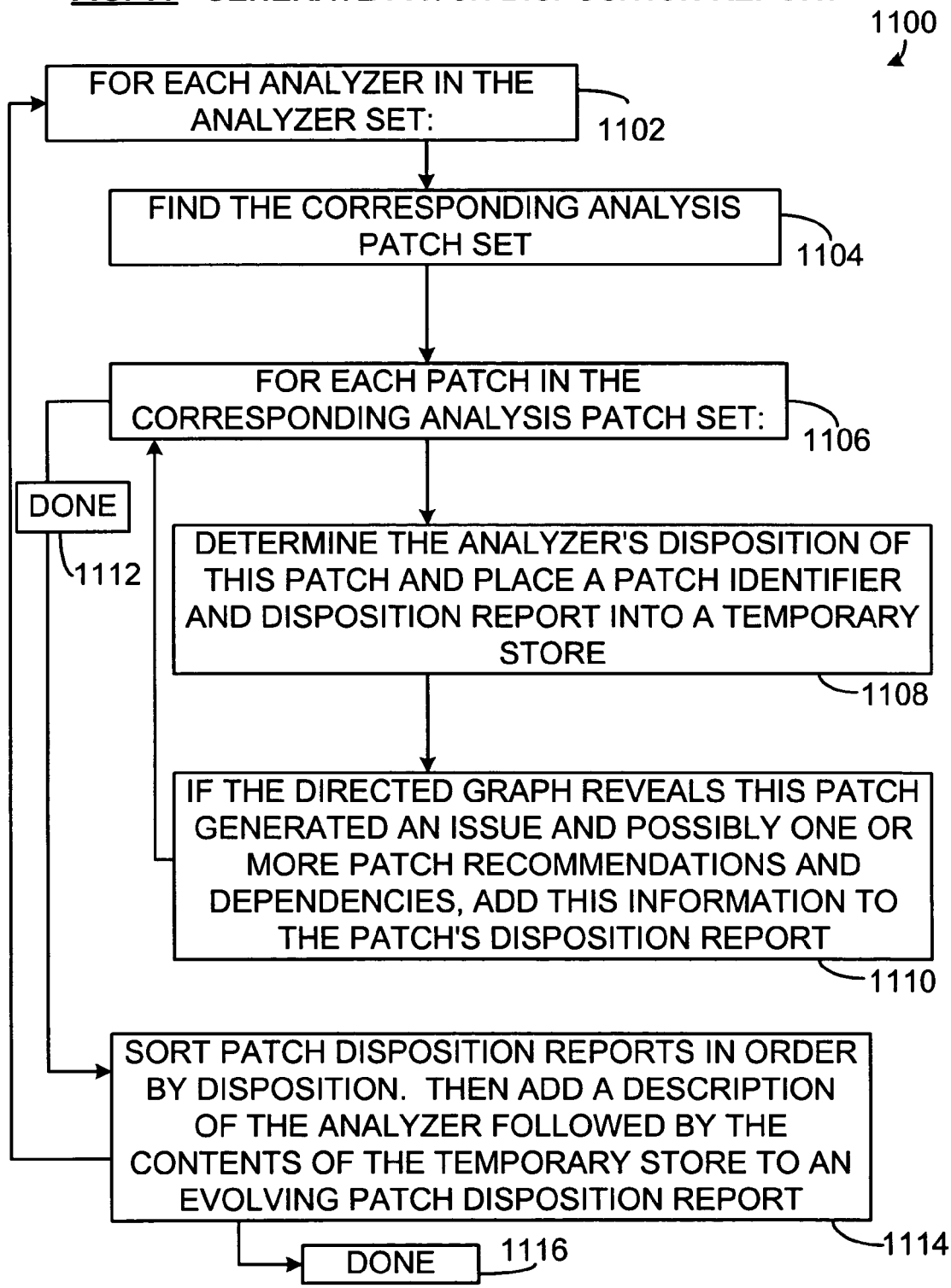

METHOD AND APPARATUS FOR DETERMINING WHICH PROGRAM PATCHES TO RECOMMEND FOR INSTALLATION

BACKGROUND

The present invention relates generally to methods and systems for assisting in the selection of program corrections and modifications for installation on computer systems.

Computer program development does not stop when computer programs are placed on the market. Continued testing and feedback from users leads to the discovery of defects that are fixed through the release of program patches. New versions of operating systems create new incompatibilities which must be addressed and corrected, and new versions of programs may also necessitate the patching of existing programs. In between the release of major new versions of programs, minor modifications and "bug fixes" are typically made by the software developer in the form of software patches which are accessible for installation by users.

Patches are typically filesets of modified program files which overlay and thereby replace some or all of the existing program files and thereby upgrade a previously installed program. Patches are created and distributed as one or more filesets, but sometimes, to save space and to speed downloads, they may be compressed in various ways prior to distribution. Thus, existing program files may be patched or repaired and not completely replaced in some cases.

Many programs come in multiple modified versions each of which conforms to a particular operating system or hardware platform or both. The differing versions of such programs require differing versions of matching patches. Thus, patches may be labeled as to their operating system and hardware platform compatibility.

Patches are frequently superseded by successor patches which are released with additional new program corrections and modifications. Some patches correct critical errors or security errors, and these are typically identified as such, while other patches may correct very minor or cosmetic defects. Some patches are developed to provide special features or to overcome very specific problems faced by some users but not by others. And in situations where several programs interact, it may not be possible to install a first patch to one program without simultaneously installing other compatible patches to other cooperating programs. Such a first patch is said to be dependent upon the other patches.

All of the above makes it clear that a patch library maintained for the benefit of the users of a particular type of computer may contain thousands of individual patches many of them quite similar to each other. It can take many hours to review manually all of the possible patches that are candidates for installation on a given system and to select which ones to actually install.

To aid in patch selection, various kinds of automated patch assessment and recommendation systems have been developed. One such system begins by having a script file executed on a target computer system (the system that is to be patched). This script file reads a registry of the operating system, programs, and patches already installed on the computer system and generates a "Product Specific Information" file containing this information. This information is compared to that contained in a patch information database, and based on this comparison a set of patches is selected for consideration. Next, any installed but bad patches are identified, and successor patches for patches previously installed are normally selected if they are available. Dependencies are also identified, and additional patches are selected as needed to satisfy these dependencies.

Another existing automated patch selection system can search through a patch database and select patches containing only the most critical updates. This system selects the earliest-to-be-released (and therefore the most thoroughly tested) patches that include any particular critical update rather than always selecting the most recently released patches, the goal being to maximize system stability, rather than to install the latest modifications.

Another existing system rates individual patches for reliability and then selects the most current set of patches that is reliable, avoiding any new patches that have not been sufficiently tested.

These prior systems proceed, in essence, by automating the tasks performed by a field engineer who examines a computer system, reviews the available patches, and then selects patches for installation. Each of these prior systems was hard coded to be prioritized in a certain way—to prioritize installing the most up-to-date patches, to prioritize installing only the earliest of patches correcting critical defects, or to prioritize installing only reliable patches. Thus, each of these systems suited the needs of some computer systems but not necessarily those of other computer systems. And altering the built-in priorities of these systems would require a major amount of software redesign. A more flexible approach to automated patch assessment would be desirable.

SUMMARY OF THE INVENTION

Briefly described, the present invention is embodied in a method or a system for selecting patches having attributes and successor relationships to recommend for installation on a given computer system. The method, for example, comprises selecting one or more patch analyzer programs from a collection of such programs and then executing each selected program, causing it to generate issues by processing a set of patches compatible with the selected program and with the computer system's installed operating system, programs, and patches. Goals are then identified for as many of these issues as practicable, each goal calling for the installation of a patch or one of its successors. Mutually consistent patch installation recommendations are then generated that satisfy as many of the goals as possible and that also satisfy any dependencies of any recommended patch on the simultaneous installation of other patches, guided by patch attributes and successor relationships.

The present invention is further embodied in a method of generating a patch disposition report comprising carrying out the above steps and, for the patches analyzed above, explaining what issues each patch gave rise to, what goals each issue gave rise to, and what recommendations each goal gave rise to.

BRIEF DESCRIPTION OF THE DRAWINGS

FIG. 1 presents an overview block diagram of one embodiment of a patch assessment process.

FIG. 2 illustrates the data structure of an embodiment of an analyzer database containing a plurality of prioritized patch analyzers each of which is designed to identify a differently prioritized class of patches and to signal one or more prioritized patch related issues.

FIG. 3 illustrates the data structure of an embodiment of a patch tree database containing patches organized into patch trees and also illustrating other information that may be associated with patches and that may be studied during priority analysis.

FIG. 4 presents a block diagram of an embodiment of the method steps that may be carried out by a user who wishes to identify a set of one or more patches having specific characteristics.

FIG. 5 presents a block diagram of an embodiment of the method steps that may be carried out by a user who wishes to select a set of analyzers to use in the patch assessment process.

FIG. 6 presents a block diagram of an embodiment of the process of selecting analyzer patch sets that match the prioritized characteristics of each analyzer and of the computer systems that are to receive the patches.

FIG. 7 presents a block diagram of an embodiment of the process of analyzing patches and generating a list of prioritized patch-related issues.

FIGS. 8 and 9 together present a block diagram of an embodiment of the process of generating goals from prioritized patch-related issues and of then generating specific patch installation recommendations from the goals, taking patch dependencies into account.

FIG. 10 presents several illustrations of an embodiment of a directed graph data structure that relates prioritized issues to goals and goals to specific patch installation recommendations, a data structure that grows and that is modified to reflect the progress of the prioritized analysis and the resolution of the prioritized issues, the goals, and any dependencies.

FIG. 11 presents a block diagram of an embodiment of the process of generating a patch disposition report following completion of the patch assessment process.

DETAILED DESCRIPTION OF THE EMBODIMENTS

Definition of Terms

The following terms used below shall have the respective meanings ascribed to them below within the context of this specification.

PATCH. A patch is, typically, a set of one or more modified or corrected versions of some of the files which comprise one or more computer programs. A patch's files are installed on a computer system to replace and thereby to update existing program files such that the operation of previously installed computer programs is modified or corrected. Patches may also contain new files, and they may be compressed to facilitate storage and downloading using a variety of compression strategies, including repairing, rather than replacing, existing program files.

SUCCESSOR PATCH. A given patch is a successor of another patch if the given patch was issued on a later date and if it includes all of the file modifications and/or changes that were included in the other patch plus additional modifications and/or changes.

PREDECESSOR PATCH. A given patch is a predecessor of another patch if the other patch is a successor of the given patch.

PATCH TREE. A patch tree is a data structure representation of a family of related patches formed by linking a most recently released "root patch" to its most immediate predecessor patches each of which in turn is linked to its most immediate predecessor patches, and so on, as is illustrated by the patch trees 304, 306, 308, and 310 shown in FIG. 3.

ISSUE. An issue is a determination reached by an analyzer that a computer system is in need of some specific adjustment or repair, typically the installation of a patch or one of its successors.

GOAL. A goal is a specific, yet preliminary, action that will resolve one or more issues, typically the installation of a patch or one of its successors.

RECOMMENDATIONS. Recommendations are a coordinated set of specific proposals to install specific patches in order to achieve a given subset of goals while also satisfying any patch dependencies and avoiding redundant and unnecessary patch installations whenever possible.

PATCH DISPOSITION REPORT. A disposition report is a report indicating, for each patch that was a possible candidate for installation on a given computer system, whether or not analysis of the patch gave rise to any issues, whether those issues led to the selection of any goals, and whether specific recommendations were made both to reach those goals and also to overcome any patch dependencies.

PATCH ANALYSIS. Analysis is the process of examining the configuration of a particular computer system and the attributes associated with a particular patch to determine whether an issue relating to the installation of the patch on that system has arisen. Analyzers are normally programs designed to analyze patch attributes and to signal issues. Specific analyzers are designed to detect certain prioritized issues relevant to the specialized needs of particular types of computer systems and to the priorities of those systems' administrators. Multiple analyzers may be utilized in the patch assessment process.

Introduction

Each program installed on a computer system, such as a PC or server, typically comprises a large number of individual files. These files are typically grouped together into one or more sets of files which may be called "filesets." Over time, due to ongoing testing, research, and feedback from users, the software engineers maintaining a program make adjustments to many or all of these files to correct defects and sometimes to add new features or to modify existing features of a program. Periodically, these engineers collect various sets of these modified files and combine them into filesets that are called program patches. Such patches may then be made available to users, administrators, and field engineers for use in updating the computer systems upon which the corresponding programs are installed.

Different versions of a program are sometimes developed to be compatible with different operating systems and different hardware platforms, and a different series of patches may be needed for use in updating each of these different versions. Patches may be hardware platform dependent as well, and some patches may also be dependent on which other programs are installed on a given computer system.

Each file in a patch typically replaces and overwrites a previously installed file that has the same file name, and a patch may also contain some new files. Over time, a series or family of related patches are normally issued, and each new "successor patch" in such a series usually contains all of the modifications and corrections that were included in one or more "predecessor patches" in the same series plus additional new modifications and corrections. A series of such predecessor and successor patches is called a "patch tree." For example, in FIG. 3 a patch tree 304 is shown which contains four patches. The first patch to be issued, PATCH_1, is shown positioned to the far left within the patch tree 304. Its successor patches, PATCH_2, PATCH_3, and PATCH_4, are shown positioned to the right of PATCH_1 and are ordered, from left to right, in the time order in which they were issued, the older patches positioned to the left, and the newer patches positioned to the right. Thus, PATCH_2 is a successor to PATCH_1 and a predecessor to PATCH_3. The newest and rightmost patch, PATCH_4, is named the "root patch."

Within a patch tree, the corrections and modifications made by earlier patches are carried forward into the later patches, and accordingly only the most current patch, or root patch, in each patch tree needs to be installed if one wishes to obtain the latest version of a computer program with all of the patch tree's modifications and corrections included. However, the root patch may not have been as thoroughly tested as have some of the patches released earlier, and thus some system managers who are seriously concerned about system reliability and stability may not wish to install the root patch but may select instead an earlier but better tested patch. Other system managers may elect to install only the earliest, and thus the best tested and most reliable, versions of patches that contain corrections for all defects deemed critical, foregoing other repairs in favor of maximizing system reliability. Clearly, different system managers can have different priorities when it comes to the basis upon which to select patches for installation.

Sometimes several patch trees are merged together, as is shown in the patch trees 310 and 306 in FIG. 3. Within the patch tree 310, for example, the patches PATCH_12 and PATCH_13 originally formed their own individual patch trees (similar to the patch tree 308 which contains only the single patch PATCH_11). The single successor patch PATCH_14 was designed to contain all of the corrections and modifications that were contained in both of the two predecessor patches, PATCH_12 and PATCH_13, plus possible additional corrections and modifications. Accordingly, the PATCH_14 has been placed into the same patch tree with the two predecessor patches PATCH_12 and PATCH_13 that it succeeds. Likewise, the patch tree 306 is shown combining three predecessor patches PATCH_5, PATCH_8, and PATCH_9 into a single patch tree. The tree-like appearance of the two patch trees 306 and 310 illustrates why the name "patch tree" was adopted for the patch data structures illustrated in FIG. 3. FIG. 3 is a patch tree database 300 that contains, illustratively, only the four patch trees 304, 306, 308, and 310. An actual patch tree database typically would contain hundreds or even thousands of different patches and patch trees.

It may not be possible to install a given patch without previously or simultaneously installing some other patch. The given patch is then said to be "dependent" upon the other patch. For example, the other patch may contain a new or modified subroutine that the given patch calls upon, or the given patch and the other patch may both need to access to a database that has been structurally modified. In FIG. 3, PATCH_7 is shown by the dotted line arrow 309 to be dependent upon PATCH_14 such that the PATCH_14 must be previously installed upon a computer system, or simultaneously installed when installing PATCH_7 can be executed on that same system. A successor patch (not shown) to PATCH_14 that includes all of its modifications and changes could be chosen and installed instead of PATCH_14.

Each patch in FIG. 3, such as the typical patch "PATCH_13", has associated with it certain patch attribute information 312 relevant to and associated with that particular patch. The illustrative set of attribute information 312 indicates that PATCH_13 is assigned the name "PATCH 13" and is assigned to the patch tree "310." The patch attribute information 312 also includes the names of the filesets (in this case, the single fileset "FS1") which this patch is intended to patch, and it includes the names of the specific files (in this case, the two files "FILE A" and "FILE B") which this patch modifies by replacement. If program version is an issue, this attribute information might also include an indication of which versions of a given program this patch is compatible with. The patch attribute information 312 also assigns to this patch a numeric quality/reliability rating of "3." This rating can range from 1 to 3: A rating of 1 signals a new patch that has undergone little testing; a rating of 2 signals a patch that has been available for some limited amount of time and that has been installed on at least some specified minimum number of systems; and a rating of 3 signals a patch that has undergone more than some specified required amount of system testing. The patch attribute information 312 indicates that this patch is marked "security" and thus corrects a problem related to system security. The patch attribute information 312 in addition indicates that this patch is not marked "critical" and thus is not the first patch to introduce a correction for some problem rated as a critical problem. The patch attribute information 312 also indicates that this patch is not marked "warning" and thus is not a patch that has been found to introduce some unexpected behavior or instability into a program's operation. Other patch attribute information (not shown in FIG. 3) might include patch program, hardware platform, and operating system compatibility information; the names of any patches which this patch is dependent upon; and the names of any predecessor and successor patches within the same patch tree.

Also associated with each patch (and not shown in FIG. 3) is a README text file or some other human understandable message file that contains a brief description of each patch and of the problem(s) the patch is intended to solve as well as additional information, such as hardware platform, operating system, and program version compatibility information. A system maintenance engineer desiring a patch having particular features can access a database of such patch README files and then search for word patterns that identify a patch having desired qualities (step 402 in FIG. 4). Other databases may also be searched for patch names (step 404). The patches found may be downloaded from the patch tree database 302 and installed onto a given system.

The Patch Assessment Process

FIG. 1 presents an overview block diagram of an embodiment of the present invention, a system of computer programs which assists a user (typically a system administrator or maintenance engineer) in producing for a given computer system a detailed recommendation of which patches to install, and optionally a detailed patch disposition report explaining why each patch was selected.

The user begins at step 104 by selecting a computer system that is to be assessed, such as a personal computer or workstation or a server. At step 106, a collection script is downloaded into the system. At step 108, the collection script is executed and caused to collect information defining its hardware and software configuration. This information is typically found in some form of registry on each computer system. The collected information indicates the nature of the hardware platform, what operating system and version the system includes, what versions of what computer programs are installed on the system, and what patches have already been installed on the system. This information is sent back to a location where the patch assessment process is being carried out.

Next, if the user has specific ideas as to which patches are to be installed, the user can optionally proceed with the process step 400 (see also FIG. 4) to identify specific patches for installation. As will be explained below (in conjunction with the description of FIG. 4), this may be done by searching for words and phrases in textual files that describe each patch (step 402 in FIG. 4). In this manner, the user may assemble a user selected patch set 118 which is later analyzed at process step 700 (FIGS. 1 and 7) by the analyzer 210 (FIG. 2), named ExplicitPatchAnalyzer, and is also later used to govern the process of generating the patch disposition report 1100.

Next, the user specifies the assessment configuration at step 102. This is the step where the user decides on what the objectives and priorities are to be during the patch selection and recommendation process. The user is presented with a list of specific patching tasks or objectives 502, 504, 506, 508, etc. (see FIG. 5), each task or objective having its own priority as to which patches are to be selected and presented as candidates for installation. The user is permitted to select one or several of these tasks or objectives, and then they are used as guides during the patch assessment process. The assessment configuration is the set of tasks or objectives that the user selects. The list shown in FIG. 5 is illustrative and is not intended to be exhaustive.

Each task or objective is associated in FIG. 5 with a specific system analyzer. To illustrate this, in FIG. 5 the names of each analyzer 202, 206, 222, and 230 is shown positioned just to the right of each task or objective 502, 504, 506, and 508.

The user can, for example select the task 502 which identifies all recommended patches which will currently install on the system being analyzed. This task is carried out by an analyzer 202 named CandidatePatchAnalyzer, a simple computer program written especially to carry out this particular patch assessment task. This analyzer prioritizes installing the most current patches that are reasonably reliable. This might be the selection of a user who is selecting patches for installation on a personal computer used in an office for word processing and spreadsheet generation, where there are no special concerns about system stability or system security, but where the most current set of patches consistent with reasonable reliability is desired to take advantage of program modifications related to such things as user convenience and simplicity.

Another user might select the task 504 which identifies all the patches that have been identified as critical patches for installation. This task is carried out by a different analyzer 206 named CriticalPatchAnalyzer which prioritizes the correction of critical issues that can cause a computer system to stop running. This might be the selection of a user working with a computer monitoring critical care patients in a hospital, where reliability and continuous trouble-free operation is a much higher priority than having the latest fancy features and the latest minor bug fixes. Only the most recent patch or patches in each patch tree that actually correct a critical defects are selected, and newer patches correcting less critical matters are not selected in this case.

Yet another user might be more concerned about security than about reliable operation. Thus, a user at a university working with a computer system that contains examination questions and answers might select the task 506, which identifies those patches that correct problems related to system security, and which also avoids other possibly newer patches related to other types of defects and new features. This task 506 selects the analyzer 222 named SecurityPatchAnalyzer which prioritizes the repair of security issues. (In Section A of the Appendix, pseudo-code for this analyzer is presented as an example of a typical analyzer computer program.) This same user might also select the analyzer 205 as well to insure that all critical errors are also corrected.

Another user concerned about system reliability might select the task 508 which identifies all installed patches that have warnings associated with them. In this manner, these patches can be displaced by later patches free of whatever defect gave rise to the warning messages. The task 509 selects the analyzer 230 named WarningPatchAnalyzer which prioritizes identifying and replacing defective patches.

The user can select several of these tasks. Thus, a user might select for an assessment configuration the two tasks 502 and 508 to obtain a current set of reasonably reliable patches but also to detect and eliminate, if possible, all defective patches. Other combinations of tasks may also be selected as the requested configuration assessment for the patch assessment process as applied to a given computer system.

Next, at step 500 in FIG. 1, a set of analyzers is selected that corresponds to the tasks comprising the requested configuration assessment. This was discussed above and is illustrated in FIG. 5. The analyzers are obtained from an analyzer database 200 which is illustrated in FIG. 2. Each analyzer 202, 206, 210, 214, 218, 222, 226, and 230 is shown adjacent a description 204, 208, 212, 216, 220, 224, 228, and 232 of the corresponding task that the analyzer is designed to carry out and also, at the end of each description, a list of the issues which that particular analyzer is capable of generating. Issues will be discussed further below. The tasks and corresponding analyzers already discussed are all shown in FIG. 2 along with additional tasks and the corresponding analyzers. The analyzer 210 named ExplicitPatchAnalyzer is an analyzer that assesses and processes the user selected patches contained in the patch set 118 (FIG. 1) and discussed above to determine which can be installed. This analyzer carries out the task of assisting the user examine and install patches which the user has identified at the step 400 (FIG. 1).

The analyzer 214 named IPatchAnalyzer identifies all the patches that are required to enable the user to run a particular application on the computer system. The analyzer 218 named InstalledPatchAnalyzer identifies any patches installed on the computer system that are unrecognized or that are missing essential patches which they are dependent upon. The analyzer 226 named SystemAnalyzer checks to insure that the latest version of the system information collector script program is being used.

The analyzers do not recommend the installation of new patches. Their task is to identify new issues that require the attention of the user. Accordingly, each type of analyzer is designed to identify one or more specific issues that require the user's attention. These issues may be resolved by later steps in the assessment process, or they may not be resolved, in which case the user is at least notified of these issues.

In this manner, an analyzer set 112 is selected and is later used in both the process of patch analysis and issue generation 700 and in the later process of generating a patch disposition report 1100.

The next step in the patch assessment process is that of searching through the patch tree database 300 (FIGS. 1 and 3) to select analysis patch sets 114 appropriate for each analyzer—process step 600 (FIGS. 1 and 6). The analysis patch sets 114 are later individually analyzed (by the process 700 in FIGS. 1 and 7 and again by the process 11 in FIGS. 1 and 11) by the corresponding selected analyzers in the analyzer set 112 first to generate the patch issues 120 (the process 700) and later to generate the patch disposition report 124 (the process 1100). The process of identifying an analysis patch set for each analyzer 600 is explained below in the discussion which accompanies FIG. 6. Among other things, the process 600 involves examining the hardware and operating system information gathered from the computer system that is being assessed (step 108) and selecting only patches relevant to that particular combination of hardware and software. The process 600 may also involve selecting for each analyzer only those patches relevant to the type of analysis that is to be performed.

Next, the patch analysis is performed at process step 700 (see also FIG. 7). In this step, each of the selected analyzers is used to process the patch set corresponding to that analyzer and included in the set of analyzer patch sets 114. Each analyzer also has access to an enumeration of the software and patches (gathered at step 110) installed on the computer system being assessed. Accordingly, software compatibility with patches can be checked out, and the analysis process can proceed with knowledge of which patches are presently installed on the system being assessed. Also, the patch trees 116 obtained from the patch tree database 300 are available so that the analysis process can be carried out with an understanding of which patches are predecessors and successors of other patches and of installed patches within the same patch tree. The details of the patch analysis and issue generation process are set forth below in the discussion which accompanies FIG. 7.

The patch analysis process step 700 just described results in the generation of patch issues 120. An issue is a matter that, in some manner, must either be addressed automatically and resolved or else must be drawn to management's attention if it cannot be resolved. Here are some illustrative examples of the types of issues that can arise during the analysis process. All of these issues are listed in FIG. 2:

CandidateNotInstalled(p)—the patch "p" has not been installed and has no successor installed on the system. This is generated by the analyzer 202 named CandidatePatchAnalyzer.

InstalledHasSuperseded(i, p)—the patch "p" has not been installed and has no successor installed on the system, and it is a successor of an installed patch "i" already installed on the system which "p" supersedes. This is also generated by the analyzer 202 named CandidatePatchAnalyzer.

MissingCriticalPatch(p)—the patch "p" is a critical patch which is not installed, has no successor installed upon the system, and is recommended for installation on the system. This is generated by the analyzer 206 named CriticalPatchAnalyzer.

MissingExplicitPatch(p)—the patch "p", explicitly selected by the user for installation, has not been installed and has no successor installed on the system. This is generated by the analyzer 210 named ExplicitPatchAnalyzer.

InstalledSupersedesExplicit(i, p)—the patch "p", explicitly selected by the user for installation, has a successor patch "i" already installed on the system. This is also generated by the analyzer 210 named ExplicitPatchAnalyzer.

InstalledMissingPatchFromSet(app, p)—a patch "p" for a particular computer program named "app" has not been installed and has no successor patch installed on the system. This is generated by the analyzer 214 named IPatchPatchAnalyzer.

InstalledUnrecognized(p)—a patch "p" is unrecognized, yet it is installed on the system. This is generated by the analyzer 218 named InstalledPatchAnalyzer.

InstalledMissingDependentIssue(p, d)—the installed patch "p" is dependent upon a patch "d," but neither the patch "d" nor one of its successors is installed on the system. This is also generated by the analyzer 218 named InstalledPatchAnalyzer.

InstalledMissingSecurityPatch(p)—the patch "p" is a security patch which has not been installed, and no successor patch has been installed, upon the system. This is generated by the analyzer 222 named SecurityPatchAnalyzer.

OldCollectionIssue—this issue indicates that the collection script used at the steps 106, 108, and 110 to gather hardware and software information and to enumerate the installed computer programs and patches is not the latest version and thus needs replacement. This issue is generated by the analyzer 226 named the SystemAnalyzer.

WarningPatch(p)—the patch "p" is installed on the system and has associated with it a warning that it is somehow defective. This issue is generated by the analyzer 230 named WarningPatchAnalyzer.

These patch issues 120 are next processed to generate goals and patch recommendations 800 in an attempt to generate a goal from each and every issue, if possible, and then to generate a set of patch recommendations for each and every goal, again if possible. The details of the steps performed by the process of performing patch analysis and issue generation 800 are presented in the discussion of FIGS. 8 and 9 which follows and also in Section B of the Appendix.

As shown in FIG. 1, the process of generating goals and patch recommendations 800 has as its primary input data a vector containing the list of patch issues 120 that were generated by the process of performing patch analysis and issue generation 700 and also the patch trees 116 that can be found in the patch tree database 300.

The process 800 builds, expands, and then sometimes modifies a directed graph 1000 five exemplary and simplified views 1002, 1004, 1006, 1008, and 1010 of which appear in FIG. 10. The patch issues 120 input into the process 800 are, illustratively, the six issues named I1, I2, I3, I4, I5, and I6 that appear in all five of the exemplary views 1002, 1004, 1006, 1008, and 1010 of the directed graph 1000 in FIG. 10. The output of the process 800 is the report setting forth the patch recommendations and patch dependencies 122. The patch recommendations and patch dependencies 122 are (for example) the patch entries P1, P4, and P5 in the directed graph view 1010 shown in FIG. 10. As FIG. 10 also shows, intermediate to the issues input (I1, etc.) and the patch recommendations output (P1, etc.) are five goals G1, G2, G3, G4, and G5 shown in all five of the directed graph views 1002, 1004, 1006, 1008, and 1010 and linked to five of the six issues I1, I2, I3, I4, and I5 (not to the issue I6, which has no corresponding goal). Four of the goals G1, G2, G3, and G4 in the directed graph view 1008 and only two of the goals G1 and G4 in the directed graph view 1010 serve as links from their corresponding issues (I1, etc.) to the patch recommendations in each of the last two directed graph views 1008 and 1010. The steps carried out by the process 800 thus can be followed by watching as the process 800 first builds and then later modifies the directed graph 1000, causing the directed graph 1000 to pass through the various states or views shown at 1002, 1004, 1006, and 1008.

The patch assessment system currently contains four different types of goals:

ExactGoal(p): Include the patch "p" (specified as a parameter of the goal) in the final solution.

RequestedMinGoal(p): Include the patch "p" (specified as a parameter of the goal) or one of its successors in the final solution as long as the included patch has no warning associated with it.

RequestedReplaceGoal(p)—Include a successor to the patch "p" (specified as a parameter) in the solution as long as the included patch has no warning associated with it.

RequiredMinGoal(p)—Include the patch "p" (specified as a parameter) or one of its successors in the solution.

For each issue identified by the patch analysis step 700, the process 800 identifies and creates a corresponding goal. Then the issues and goals are stored as nodes in the directed graph 1000, with the goals linked back to the appropriate issues, as is shown in FIG. 10. Here are five examples of issues and the corresponding goals:

| ISSUE | GOAL |
| --- | --- |
| WarningPatch(p) -> | RequestedReplaceGoal(p) |
| MissingCriticalPatch(p) -> | RequestedMinGoal(p) |
| InstalledMissingDependentIssue(p, d) -> | RequiredMinGoal(d) |
| InstalledMissingSecurityPatch(p) -> | RequiredMinGoal(p) |
| MissingExplicitPatch(p) -> | ExactGoal(p) |
| OldCollectionIssue -> | (none) |

The issue-goal set illustrated above is depicted as a directed graph view 1002 in FIG. 10, where I1 through I6 correspond to the six issues and where G1 through G5 correspond to the five corresponding goals. The sixth issue I6, "OldCollectionIssue," has no matching goal in this case and simply signals that the patch evaluation process should be restarted with the correct current version of the collection script used at steps 106, 108, and 110 in FIG. 1.

Next, a partial solution is located by searching the patch trees 116 for a set of patches which resolve as many of the goals as possible. During this search, the identified patches are added to the directed graph 1000 as nodes, linked back to the goal or goals which they resolve. During this search, it is desirable to include only patches which resolve goals. It is also desirable to avoid including more than one patch from any given patch chain appearing in the solution. During this phase, it is likely that a patch may solve multiple goals, and that some goals will not be solved.

The process 800 attempts to resolve all of the goals. Given the patch parameter specified in the goal, the process locates that patch or an appropriate successor patch within that patch's patch tree and then adds it to the directed graph 1000. If a successor to that patch is already in the directed graph 1000, then that successor patch is selected. If a predecessor to that patch is already in the directed graph 1000, then the predecessor patch is removed and a linkage to the selected patch is used in its place.

In the example shown in the directed graph exemplary view 1002 presented in FIG. 10, this process might generate the directed graph view 1004. In this example, the patch P1 solves the two goals G1 and G2, the patch P2 solves the goal G3, the patch P3 solves the goal G4, and the goal G5 is left unresolved.

Finally, all of the dependencies required by the recommended patches P1, P2, and P3 must be resolved. The process 800 continues to add patches to satisfy patch dependencies until all of the dependencies have been satisfied.

For example, in the directed graph view 1006 in FIG. 10, the patch P1 has dependencies that are satisfied by the addition to the directed graph of the additional patches P4 and P5. The patch P2 has dependencies that are satisfied by the addition to the directed graph of the additional patches P6 and P7. As the directed graph view 1006 indicates, the patch P3 is also dependent on the patch P7. The patch P6 introduced to satisfy the dependencies of the patch P2 is itself dependent upon the additional patch P8, which has also been added to the directed graph view 1006.

The procedure simply keeps on adding the necessary patches to resolve all dependencies until all unresolved dependencies are resolved. However, the availability of patches and their quality may result in the need to apply relatively sophisticated search algorithms with backtracking to create a consistent solution. Additionally, algorithms which prune the search space are desirable, as the number of available patches can be quite large, possibly in excess of 20,000 patches.

Dependency resolution may result in a successor patch being used in place of the originally recommended patch. For example, if the patch P5 in the directed graph view 1006 was a successor to the patch P3, then the directed graph view shown at 1008 would result, with the patch P3 removed and replaced with a link to the patch P5. The goal G4 is now resolved with the patch P5, the successor to the patch P3, rather than by the patch P3, as is shown here.

Dependency resolution may also result in a recommendation being removed from the solution. For example, if the patch P7 was marked as temporarily unavailable, then the patch P2 would not be usable (since it is dependent upon the patch P7), and therefore the patch P2 would have to be removed from the directed graph view, leaving the goal G3 and the issue I3 unresolved. This is illustrated in the directed graph view 1010 shown in FIG. 10.

Returning once again to the directed graph exemplary view 1008, let it be assumed that this directed graph is the final result of the process of generating goals and patch recommendations 800. This directed graph can be used to present the results of the patch assessment process to the user. The recommended patches for the system being assessed, visible in the directed graph 1008, may be partitioned into two groups: those that satisfy a particular goal or goals, namely P1, P2, and P5; and those that satisfy dependency requirement, namely P4, P5, P6, P7, and P8 (the patch P5 appears in both lists). These two groups of patches constitute the patch recommendations and the patch dependencies 122 both of which are recommended for installation by the patch assessment process 100.

By following the linkages from each patch back to the goal and to the underlying issue or issues, the association of the patch recommendations to the specific issues identified through analysis can be made clear. In the case of the directed graph exemplary view 1008:

| | |
| --- | --- |
| P1 -> | {I1, I2} |
| P2 -> | {I3} |
| P5 -> | {I4} |

This association can be presented to the user with an indication that the user should install the recommended patches to resolve these specifically-identified issues. The dependency resolving patches are then all of the remaining patches shown in the view 1008 and not linked directly to goals in the directed graph 1008. These dependency resolving patches can also be presented to the user with an indication of what dependencies they resolve. The user is thus presented with a patch assessment report patch recommendations and patch dependencies 122.

Finally, issues not resolved, such as I5 and I6 in the directed graph exemplary view 1008, may also be listed in this patch assessment report.

The final assessment report recommends the installation of the recommended patches P1, P2, and P5 and the dependent patches P4, P6, P7, and P9. It warns that the issue I5 and goal G5 and also the issue I6 have not been satisfactorily resolved.

It explains that the issues I1 and I2 are resolved by the patch P1; the issue I3 is resolved by the patch P2; and the issue I4 is resolved by the patch P5.

While such a patch assessment report is relatively satisfactory for many users, some users, particularly highly skilled system administrators and maintenance engineers, may desire a more detailed audit trail report that lists every available patch and that explains why each patch was or was not recommended for installation. Such users, who may have selected patches manually in the past, are likely to appreciate receiving a report that presents the information relating to each patch in a way that more closely resembles the analysis process they would have gone through had they studied the same set of patches in a more conventional way.

In accordance with another aspect of the invention, a process 1100 generates a patch disposition report intended to satisfy such users. In one embodiment, the process 1100 receives as a first input the information contained in the directed graph 1000. This information enables the process 1100 to determine, from the name of any recommended patch, which goal and which issue gave rise to the recommendation of that patch, since patch names appear as arguments to each patch issue and each goal. Accordingly, the process 1100 is able to trace back from any recommended patch to the corresponding goal and issue, and also to trace forward from any recommended patch to any patches needed to satisfy dependencies. This can be done for every patch that gave rise to a recommendation.

The process 1100 also receives as a second input all of the analysis patch sets 114 and also the user selected patch set 118 (if any). Accordingly, the process 1100 can report by name every patch that was analyzed, and it can indicate, for each patch, what recommended patch installation may have arisen from that patch, if any.

The process 1100 receives as its third and fourth inputs the patch trees 116 and the analyzer set 112. Accordingly, the routine is able to re-execute all of the analyzers against all of the patches in the corresponding analysis patch sets in a different mode such that as each analyzer analyzes each patch, a report is generated indicating the analyzer's disposition of each patch. This can be done as just explained, by having the analyzers process the patch information a second time in a different mode to generate these reports, or these same reports can be generated during the first pass of the analyzers over the patches as part of the process 700, with the reports indexed by patch name and saved for later processing by the process 1100. Other configurations are also possible.

The process 1100 is, accordingly, able to print out for each patch that was analyzed: a summary of the results of the patch analysis (recommended or not recommended for installation and why); the issue (if any) that the analysis process generated for that patch; the goal (if any) resulting from that issue; the patch (if any) ultimately recommended for installation; and a list of any additional patches that were recommended to overcome dependencies.

These individual patch reports may first be organized or arranged into patch set groups by the analyzers that examined the patches in each set; and within each such analyzer set of patch reports, the patches may be further organized into patch set sub-groups by the issues that the patches each gave rise to.

The following patch dispositions are generated by one embodiment of the process 1100:

Installed patch "p" with warning has no recommendable successor.
Installed patch "p" with warning has recommendable successor "q".
Installed patch "p" with warning has recommendable successor "q" in patch bundle "B".
Desired patch "p" already installed on system.
Desired patch "p" has successor "q" already installed on system.
Desired patch "p" is recommended.
Desired patch "p" has recommendable successor "q".
Desired patch "p" is contained in recommended bundle "B".
Desired patch "p" has successor "q" contained in recommended bundle "B".
Desired patch "p" is not appropriate for HW/OS of this system.
Desired patch "p" is not appropriate for the system (missing base product).
Failed to find recommendation for patch "p".

Since the individual patch reports are organized first by analyzer and within each analyzer group by patch disposition, the user is given the impression that the patch assessment process 100 computed the patch disposition report incrementally—in a manner similar to how manual patch assessments are done. This bolsters the user's confidence in the tool's generated solution and makes the assessment process more intuitive and thus more understandable. And since this patch disposition report 124 contains the following four dispositions which do not correspond to issues generated or patches recommended Desired patch "p" already installed on system
Desired patch "p" has successor "q" already installed on system
Desired patch "p" is not appropriate for HW/OS of this system
Desired patch "p" is not appropriate for the system (missing base product)

the detailed assessment report provides, for each non-recommended patch, an answer to the question "Why isn't the patch "p" being recommended for installation?"

The details of the process 1100 that generates the patch disposition report 124 are presented in the discussion of FIG. 11 below.

User Identification of Specific Patches

With reference to FIG. 4, the user may select specific patches for installation in a semi-manual fashion, if desired. For example, if a particular program is displaying some undesired symptom, the user can search for a specific patch directed towards the elimination of that particular symptom.

The user may use some form of text searching and document retrieval program to search through the README text files that are associated with each patch, searching for a word pattern that distinguishes each desired patch from other patches, as shown at step 402. Alternatively, the user may search other databases of articles seeking out the names of specific patches to install (step 404). In either case, the user may find the selection of patches limited by a "visibility" rating of each patch which prevents normal users from finding any patches save well-tested patches while permitting skilled system engineers to see many more patches, some not as well tested, and which may permit engineers working for the software suppliers or computer maintenance companies to see additional patches that may not yet have been released for commercial distribution (step 406).

Using any and all of these techniques, the user, at step 408, identifies specific patches which the user wishes to install on the computer system being assessed and then combines these patches into a user-selected patch set 108, shown in FIG. 1. Then, at the step 410 (FIG. 4), during the process of the user specifying the assessment configuration 102, the user makes a choice which causes the process of selecting a set of analyzers 500 to include in the analyzer set 112 the analyzer 210 (FIG. 2), which is named ExplicitPatchAnalyzer, to review these user-selected patch set 118. The patch set 108 is later processed during the process of patch analysis and issue generation 700 and during the process of generating the patch disposition report 1100, as is explained below (step 412).

Identifying an Analysis Patch Set for Each Analyzer

With reference to FIG. 6, the steps are shown which identify an analysis patch set to correspond with, and to be processed by, each of the analyzers which the user selected at steps 102 and 500. For each analyzer in the analyzer set 112 (step 602), patches are first obtained from the patch tree database 300 such that (step 604) all the patches selected are fully compatible with the given computer system's installed operating system and (optionally) hardware, and relevant to the given computer system's installed computer programs and (optionally) also compatible with the particular versions of the installed software (not shown in FIG. 6). The patches may also be obtained such that the patch attribute information associated with each patch at 312 in FIG. 3 is also compatible with one or more of the attributes of each analyzer. For example, the analyzer 230 named WarningPatchAnalyzer is concerned with patches having the warning patch attribute data bit set, while the analyzer 206 named CriticalPatchAnalyzer is concerned with patches having the critical patch attribute data bit set, while the analyzer 222 named SecurityPatchAnalyzer is concerned with selecting patches having the security patch attribute bit set. In this manner, an analysis patch set is selected for each analyzer, as is illustrated at 606 in FIG. 6.

Perform Patch Analysis and Issue Generation

FIG. 7 presents a block diagram of the process that performs patch analysis and issue generation 700. At step 702, this process selects in succession each of the analyzers in the analyzer set 112 and then performs the steps 704 through 716 for each selected analyzer.

Beginning at step 704, the process 700 obtains from the analyzer patch sets 114 the analyzer patch set for a particular selected analyzer. Then, at step 706, the process 700 selects in succession each of the patches in the analyzer patch set for the selected analyzer and then performs the steps 708 through 716 on each selected patch.

At step 708, the process 700 verifies that the computer system to be assessed does have installed upon it the software that a particular selected patch repairs or modifies. If not, then at step 716, the next patch in the analyzer patch set is selected for analysis. If the software is installed on the system, then program control proceeds with the step 710.

At step 710, the process 700 checks the enumeration (step 110) of installed patches to see if the selected patch is already installed on the computer system. If so, then at 716, the next patch in the analysis patch set is selected for analysis. If this patch has not been installed, then program control proceeds with the step 712.

At step 712, a further check is made to see if a successor to this patch (in its patch tree) has already been installed on the system. If so, then at step 716 the next patch is selected for analysis. If no successor patch has been installed, then at step 714, an issue appropriate to this analyzer is generated that includes this patch as one of its arguments. The issue is added to the set of patch issues 120; and then, at step 716, the next patch is selected for analysis. This cyclic patch analysis process continues until all of the patches in the relevant analyzer patch set have been examined.

The process 700, as described here, is typical of patch analysis and issue generation process 700 and presumes that much of the initial work of selecting patches for analyses has already been done by the process 600 which identifies the analysis patch sets that are to be analyzed by each analyzer. Depending upon their assigned analysis task, some analyzers will be designed to function somewhat differently than was described here. A typical analyzer design can be found presented in Section A of the Appendix.

Generating Goals and Recommendations and Solving Dependencies

The two FIGS. 8 and 9 together present the steps needed, starting with the set of patch issues 120, first to generate specific patch installation goals from as many issues as possible, and then to generate from the goals a list of as many specific patch installation recommendations as possible, together with a list of additional patches that must be installed first or simultaneously because the recommended patches are dependent upon them (the patch recommendations and patch dependencies 122).

The process of generating specific goals corresponding to specific issues was discussed above, and examples of the mapping of specific issues into specific goals were presented. The directed graph views 1002, 1004, etc. shown in FIG. 10 were also discussed fully above, and these illustrate the mapping of specific issues I1 through I5 into specific goals G1 through G5 and then into specific patch recommendations, as shown. The specific process steps taken are set forth in FIGS. 8 and 9.

With reference first to FIG. 8, the process of mapping issues into goals begins with the list of specific patch issues 120 (FIG. 1). Examples of specific issues are shown in FIG. 2 within the boxes 204, 208, 212, 216, 220, 224, 228, and 232. These were discussed individually above. At this point, it should be noted that most issues (the sole exception in FIG. 2 being the OldCollectionIssue shown at 228) have, as an argument, a specific patch "p" that is a preliminary choice to be a candidate for installation. In a few cases, the patch "p" may be one that is not properly installed. For example, the issue may indicate that the patch is not recognizable—"InstalledUnrecognized(p)." Or the issue may indicate that the patch is dependent upon a patch that has not been installed—"InstalledMissingDependentIssue(p, d)". But in a majority of cases, each issue specifically recommends that a patch be installed.

It should be noted in passing that an issue may also have a secondary argument—for example, an issue may specify the identity of the application "app" which requires a recommended patch "p"—"InstalledMissingPatchFromSet(app, p)," or it may specify the identity of a patch needed to satisfy a dependency requirement of a recommended patch "p"— "InstalledMissingDependentIssue(p, d))," or it may identify an installed patch "i" that a recommended patch "p" supersedes—"InstalledSupersedesExplicit(i, p))." The extra arguments "app," "d," and "i" typically make the issue a clearer statement of the problem detected and of why the particular patch "p" was recommended, but in general these extra arguments are not carried over into the goals generated to match each issue.

Referring now to FIG. 8, the process of generating goals and patch recommendations 800 begins at the step 802 with the creation of a directed graph 1000 (FIG. 10). An empty directed graph is first populated with all of the issues $I_1, I_2, I_3 \ldots I_N$. Next, at step 804, an attempt is made to select a goal $G_1, G_2 \ldots G_N$ corresponding to each issue, as was illustrated above, and at step 806, that goal is also established as a node in the directed graph 1000 and is linked back to the corresponding issue or issues, as is shown in all of the exemplary views 1002, etc. The goals typically contain, as an argument, the identity of a single recommended patch "p", but the goals are not precise restatements of the problems identified by each issue which gave rise to the need to install each of the proposed patches. A goal is, instead, a precise statement of how the particular recommended patch "p" or a successor of that patch is to be selected for inclusion in the final set of recommendations. The goal's selection is very much dependent upon the specific nature of each specific issue, and accordingly each specific type of issue maps into a specific type of goal. But there are fewer goal formulations than there are issue formulations, and the goal formulations typically include only one recommended patch name as a single argument instead of two arguments. And some issues cannot be mapped into specific goals. But the goals are more specific in stating and later controlling just how a recommended patch "p" or a successor patch is to be selected and then recommended in the context of all of the patch trees 116 which contain successor patches having varying attributes.

The patch assessment system of one embodiment contains four different types of goals, each of which specifies under what conditions a recommended patch can be installed and when a more current successor patch is to be selected:

ExactGoal(p): The patch "p" (specified as a parameter of the goal), and not a substitute or successor, is definitely to be included in the final set of patch recommendations without regard to warnings, etc. For example, the patch "p" may be a user-selected patch, and the user is mandating its installation regardless of its attributes.

RequestedMinGoal(p): Include the patch "p" (specified as a parameter of the goal) or one of its successors in the final set of patch recommendations as long as the recommended patch has no warnings associated with it. For example, the patch "p" may be a missing critical patch.

RequestedReplaceGoal(p)—Include a successor to the patch "p" (specified as a parameter) in the final set of patch recommendations as long as the successor patch has no warnings associated with it. For example, the patch "p" may itself be one that has warnings associated with it.

RequiredMinGoal(p)—Include the patch "p" (specified as a parameter) or one of its successors in the final set of patch recommendations without regard to warnings, etc. For example, the patch "p" may be a missing security patch, or it may be a patch which is not installed which is dependent on a patch which was previously installed.

Next, at the step 808, one searches through the patch trees 116 found in the patch tree database 300 looking for specific patches that satisfy each of these goals. If a given patch, for example, has a warning associated with it, a successor patch in the same patch tree can be substituted for that patch. Thus, the patch attribute information 312 (FIG. 3) may need to be checked before any given patch can be selected. If no satisfactory patch can be found, then the corresponding issue and goal may be left unresolved in the final set of patch recommendations.

If several goals are satisfied by differing patches sharing the same patch tree, then at step 810, if possible consistent with the specifics of each goal, a single patch from that patch tree is selected that satisfies as many of the goals as is possible. Thus, for example, the patch P1 is a single recommended patch that satisfies both of the goals G1 and G2 in the directed graph exemplary view 1004 (FIG. 10). For purposes of illustration, it may be assumed that the Issues I1 and I2 and the goals G1 and G2 may have had, as arguments, two different patches that resided in the same patch tree. In the step 810, that patch tree was examined, and a patch was selected from that patch tree which may have been one of those two patches, and it may have been a successor to the other of the two patches; or it may have been a successor to both of those two patches if, for example, a warning or other attribute of the other of the two patches prevented its selection.

The process of reviewing patches for any dependencies on other patches begins in FIG. 9 at the step 812, where the list of patches associated with goals is scanned to identify those that are dependent upon the prior or simultaneous installation of other patches for their proper operation.

Next, at the step 814, each of the patches "D" upon which any patch "P" depends is checked out individually by the steps 816 through 832. This process is continued until all of the patch dependencies have been fully checked out and until the directed graph 1000 has been adjusted to reflect the addition of any patches added to overcome dependencies and subjected to any other adjustments that may be needed.

With reference to FIG. 10, the directed graph exemplary views 1002, etc. are all organized into at least three vertical columns. In a left-most column, each directed graph contains a list of all of the issues $I_1$ through $I_6$ generated by the process of patch analysis and issue generation 700, each issue normally having one to two arguments (not shown in FIG. 10) including at least one patch being preliminarily recommended for installation by each issue to overcome some problem. In the next vertical column positioned to the right of the issues column are listed all of the goals $G_1$ through $G_4$ identified by the steps 802 to 810 of the process of generating goals and patch recommendations 800, each goal also having an argument (not shown in FIG. 10) that is normally a patch recommended for installation, and each goal linked to one or more of the issues. In the third vertical column positioned to the right of the goals column, all of the patches $P_1$, $P_2$, and $P_3$ recommended for installation by the process 800 are shown, all included in this one vertical column and linked back to the related goals. The remaining two or three or more vertical columns positioned to the right of the others contain patch dependency installation recommendations—patches recommended to overcome the dependency problems of the patches included in the third vertical column or to overcome the dependencies of other dependency-resolving patches.

With reference to the steps 814 to 832 in FIG. 9, each patch D that is needed to satisfy the dependency needs of some other patch is processed as follows:

At step 816, if the patch D or one of its successors is already installed on the system that is being assessed, then there is no need to do more with this patch. Accordingly, program control returns to the step 832 where the next patch D needed to satisfy some dependency requirement is processed. And if no patches D remain, then the process 800 generates the patch recommendations and patch dependencies 122 and terminates.

If the patch D or its successor has not been installed, then at step 818, the directed graph is checked to see if the patch D or one of its successors in a patch tree already appears in the directed graph as recommended for installation. If so, then at the step 830, the patch D or its successor in the directed graph is linked to the dependent patch P's entry in the directed graph. For example, in the exemplary directed graph 1006 in FIG. 10, the single patch P7 is shown linked to both of the recommended patches P2 and P3, satisfying dependency requirements of both of the patches P2 and P3.

If the patch D or its successor does not already appear in the directed graph, then at step 820, the best available version B of the patch D or one of its successors is added to the directed graph and is linked to the original patch P (which was dependent upon D or its successor B). In the directed graph exemplary view 1006 shown in FIG. 10, the patches P4, P5, P6, P7, and P8 have all been added to the directed graph and have then been linked back to the respective patches P1, P2, and P3 which depend upon them, as is shown.

Next, adjustments are made to the directed graph in an effort to prevent it from containing two or more patches selected from the same patch tree. At step 822, for each predecessor patch C of the best version patch B which appears anywhere within the directed graph 1000: the step 824 replaces each link from each predecessor patch C with a link from the patch B to the patch which the predecessor patch C was linked to. Then, at the step 826, the patch C is removed from the directed graph—all patches not having a direct or indirect link to at least one issue in the directed graph are removed. For example, in the directed graph exemplary view 1006 in FIG. 10, a patch P5 is shown linked to a patch P1 to satisfy the patch P1's dependencies. Assume that the patch P5 is a successor of the patch P3 installed to satisfy the goal G4 and thus to overcome the issue I4. The step 822 scans the directed graph and detects the patch P3 and notes that it is a predecessor of the patch P5. Then the step 824 links the patch P5 directly to the goal G4, and the step 826 removes the patch P3 from the directed graph, as is shown in the directed graph exemplary view 1008. This process continues with all of the predecessor patches C of the patch B at step 828 until all of the predecessor patches C in the patch tree of the patch B have been searched for in the directed graph 1000—the patch tree is thus explored completely from the patch B back to the most remote leaves of the patch tree. Then program control returns to the step 832 and returns to step 814 where the next patch D (upon which some issue-resolving patch P is dependent) is examined. If all the patches D have been examined, the patch recommendations and patch dependencies 122 are read from the directed graph 1000 and are reported.

Generating the Patch Disposition Report

One embodiment of the procedure for generating the patch disposition report 1100 is set forth in FIG. 11. As shown in FIG. 1 and described above, this process utilizes the patch recommendations and patch dependencies 122 or the directed graph 1000 or both as one source of information about the issues, the goals, and the resolution of the specific issues and goals by the specific recommendations set forth in the directed graph 1000. But that information does not explain why many of the patches included in the several analysis patch sets 114 and in the user selected patch set 118 and thus candidates for installation were rejected by the individual analyzers in the set of analyzers 500 selected by the user (through the user assessment specification—see the steps 102 and 500 discussed above). Accordingly, the process of generating the patch disposition report 1100 in this embodiment calls upon the same analyzers to reprocess the analysis patch sets 114 and the user selected patch set 118 and to generate an indication of why each rejected patch was not recommended for installation. In this embodiment, the execution of the analyzers is thus a two-step process: a first step during which each analyzer passes through its own analysis patch set (found in the sets 114) and identifies issues for later use in generating goals and patch recommendations; and a second step during which each analyzer passes through its own analysis patch set (found in the sets 114) a second time and this time generates a brief disposition report relating to each patch. Another embodiment could generate both the patch issues 120 and the brief disposition report relating to each patch during a single pass of each analyzer, or the patch issues information could simply include this brief patch disposition report information. Other arrangements of the code are also possible.

FIG. 11 presents a high-level view of the disposition report generation process. The steps 1102 through 1114 are executed repeatedly. Each time through these steps, a different analyzer is selected at the step 1102. The analyzers selected are those contained in the analyzer set 112 described above (shown in FIG. 1) which controlled the process 700 of generating the patch issues 120.

During each performance of the steps 1102 through 1114 for a selected analyzer, the step 1104 begins by locating the analysis patch set 114 corresponding to that analyzer (identified by the process step 600 discussed above). Then the sub-steps 1106 through 1110 (within the steps 1102 to 1114) are executed repeatedly, with each repetition focusing upon one individual patch of the analysis patch set 114 corresponding to that analyzer. The step 1108 determines the analyzer's disposition of this patch (recommended for installation, or not recommended for installation, and why) and then places the patch's identifier and its disposition into a temporary store. If the directed graph 1000 reveals that this patch did cause the generation of an issue, a goal, and/or a recommendation for installing a specific patch, then the step 1110 adds this information to that in the temporary store.

After the step 1112 determines that all of the patches in this analysis patch set 114 have been examined, the step 1114 sorts the patch disposition reports into order organized by patch disposition and adds a description of the task performed by this analyzer to the information in the temporary store. The contents of the temporary store are then added to an evolving patch disposition report 124. Then, if there is another analyzer in the analyzer set 112, program control returns to the step 1102 and the steps 1104 to 1114 are repeated for the next analyzer's analysis patch set 114. This process continues until, at step 1116, the dispositions of all of the individual patches in analysis patch sets 114 and also the patches in any user selected patch set 118 have been reported upon in the patch disposition report 124.

The process just described could be carried out in different ways. For example, a special program could have been written to carry out this process. The elements of the patch disposition report could have been sorted into different orders to facilitate their more convenient study, and the elements of this report could have been produced as a searchable database to facilitate the presentation of this information in many different ways.

In an embodiment of the programs that perform the process of generating the patch disposition report 1100, the programs that implement analyzers (described above) have been augmented with the capability to also provide a textual description of the analyzer's disposition (to recommend or not to recommend and why) of each individual patch. In the report, these explanations are organized in a conceptual manner, one that leaves the user with the impression that the recommendations could have been generated manually by a human rather than by a computer program. The presentation of recommendations in the patch disposition report 124 is thus understandable and reassuring to the user.

Within the program implementing all of this, the detailed patch assessment process that generates the patch disposition report 1100 calls upon the routine that performs patch analysis and issue generation 700 as a subroutine. Pseudo code describing this process 1100 is provided below:

```
// Perform patch assessment process 100 (FIG. 1)
AssessSystem (System system, AssessmentProfile profile)
{
        // Perform patch analysis and issue generation 700 (FIGS. 1 & 7)
        Issues = { };
        for each analyzer specified in profile
        do
                A = locate the analyzer;
                // Perform an analysis of
                A_issues = A.analyze(system);
                Issues = Issues + A_issues;
        done
        // Generate goals and patch recommendations 800 (FIGS. 1, 8, & 9
        { Recommendations, Dependencies } = makeRecommendations
        (Issues);
        Return {Recommendations, Dependencies };
}
```

To generate the detailed patch assessment, the output of the basic patch assessment is fed back into each of the analyzer programs. Each analyzer is responsible for generating a section of the final document or report, which is constructed by concatenating all of the individual sections together and sorting them:

```
// Generate patch disposition report 1100 (FIG. 11)
AssessSystemDetailed (System system, AssessmentProfile profile)
{
        { Recommendations, Dependencies } = AssessSystem(system,
        profile);
        Document = empty document;
        for each analyzer specified in profile
        do
                A = locate the analyzer;
                A_document = A_analyzerDetailed(system,
                Recommendations, Dependencies);
                Append A_document to Document;
        done
        Return Document;
}
```

After the patch disposition report 124 document is created, it can be displayed to the user, who can then save it for future reference.

The resulting disposition report 124 is organized by analyzer—each selected analyzer has its own section. Within the analyzer's section, the disposition of all patches in the analysis patch set for that analyzer is presented, organized by disposition. The possible dispositions applicable to each patch were set forth above.

The analyzerDetailed routine for each analyzer identifies the appropriate analysis_Patch_Set for that analyzer or for the system being assessed. For each patch in the set, the disposition is determined. Finally, the report is constructed, grouping the patches by disposition, and ending with a list of recommended items (patches and patch bundles). Pseudo code for this routine is set forth here:

```
Analyzer::analyzerDetails(System system,
                List Recommendations,
                List Dependencies) {
        // clear the list of patches.
        dispositions{*} = { };
        analyzer_recommendations = { };
        // process each patch in the Analysis_Patch_Set for this system.
        List Analysis_Patch_Set = compute_analysis_patch_set (system);
        for each patch P in Analysis_Patch_Set
        do
                // determine the disposition of this patch - create a string
                // describing the disposition. Atthe same time, determine if
                // a recommendation was made.
                {disposition, recommendation} =
                        determineDisposition(P, system, Recommendations,
                        Dependencies);
                dispositions {typeof(disposition)} += disposition;
                if (recommendation != null)
                        analyzer_recommendations += recommendation;
        done
        // build this report
        report = report with appropriate header
        for each disposition D of all dispositions located above
        do
                add section describing D and dispositions{D} to report;
        done
        // add a summary section describing all items recommended by this
        // analyzer
        report += analyzer_recommendations;
        return report;
}
```

By organizing the report by analyzer and within the analyzer section by disposition, the user is given the impression that the patch analysis tool computed the assessment incrementally—in a manner similar to how manual patch assessments are created. This bolsters the user's confidence in the tool's generated solution.

While several embodiments of the invention have been described, further modifications and changes will occur to those skilled in the art. Accordingly, the claims appended to and forming a part of this specification are intended to cover all such modifications and changes as fall within the true spirit and scope of the invention.

APPENDIX

A. Security Patch Analyzer

The following pseudo-code for the Security Patch analyzer is typical. The analyzer obtains a set of patches and verifies that they (or their successors) are installed on the system. A vector of issues is returned.

```
/**
 * Analyze the patch system for missing security patches.
 *
 * parameter system -- the system being analyzed
 * return a vector of issues
 */
public Vector analyze(system)
{
    Vector result = new Vector( );
    Set securityPatches = locateSecurityPatches(system.getOS( ));
    for p in securityPatches {
        if (not patchOrSuccessorInstalled(p, system) {
            result.addElement(new
InstalledMissingSecurityPatch(p.getId( )));
        }
    }
    return result;
}
```

B. Issue Resolver—Generating Goals and Patch Recommendations

The following pseudo-code is for the issue resolver. The class is a collection of methods, of which resolveIssues( ) is the entry point. This method will return a graph which can be used to trivially obtain the result of the patch assessment.

There is an additional step called retryUnresolvedGoals. This step happens after the dependencies are computed. At that point, a patch introduced as a dependency may resolve a previously unresolved goal. This can happen because the patch was initially considered inappropriate (perhaps not recommendable because of a warning). However, once used as a dependency, the patch will be identified as resolving the unresolved goal.

```
public class
{
   // add a patch to the graph and link the patch to the reason node
   // in the graph. The reason will either be a goal, when the patch
   // resolves a goal, or another patch, when the patch is a dependent.
   private void addPatch(graph, patch, reason)
   {
      graph.addObject(patch);
      // link the patch to the original reason
      graph.addLink(patch,reason);
      // any predecessors of the patch in the graph must be removed
      // copying their links to the newly added patch.
      Vector predecessors = locatePredecessorsInGraph(graph, patch);
      for pred in predecessors {
         // skip if the graph no longer contains the patch
         if (! graph.containsObject(pred))
            continue;
         // Identify all of the items this predecessor links to in the graph.
         Vector nodes = linksTo(graph,pred);
         // use the patch instead
         for each node in nodes {
            graph.addLink(patch,node);
         }
         // take out the predecessor!
         graph.remove(pred);
         // remove any patch in the graph which does not have a path
         to an issue
         removeAllPatchesWithoutPathToAnIssue(graph);
      }
   }
   private void processRequiredMinGoal(graph, goal)
   {
      Patch patch = goal.getPatch( );
      // use the successor in the graph if it is already there.
      Patch sucItem = patchOrSuccessorInGraph(graph,patch);
      if (sucItem != null)
         patch = sucItem;
      else {
         // locate the best version of the patch
         patch = locateBestVersion(patch);
      }
      if (patch != null)
         addPatch(graph, patch, goal);
   }
   // Locate a patch to resolve a RequestedMinGoal and add the patch
   // to the graph.
   private void processRequestedMinGoal(graph, goal)
   {
      Patch patch = goal.getPatch( );
      // use the successor in the graph if it is already there.
      Patch sucItem = patchOrSuccessorInGraph(graph,patch);
      if (sucItem != null)
         patch = sucItem;
      else {
         // locate the recommended version of the patch -- may not exist
         patch = locateRecommendedVersion(patch);
      }
      if (patch != null)
         addPatch(graph, system, patch, goal);
   }
   // Locate a patch to resolve a RequestedReplaceGoal and add the patch
   // to the graph.
   private void processRequestedReplaceGoal(graph, goal)
   {
      Patch patch = goal.getPatch( );
      // advance to the successor
      patch = successor(patch);
      if (patch != null) {
         // use the successor's successor in the graph if it is already there.
         Patch sucItem = patchOrSuccessorInGraph(graph,patch);
         if (sucItem != null)
            patch = sucItem;
         else {
            // locate the recommended version of the successor -- may
            not exit
            patch = locateRecommendedVersion(patch);
         }
      }
      if (patch != null)
         addPatch(graph, system, patch, goal);
   }
   // Locate a patch to resolve a ExactGoal and add the patch
   // to the graph.
   private void processExactGoal(graph, goal)
   {
      Patch patch = goal.getPatch( );
      // use the successor in the graph if it is already there.
      Patch sucItem = patchOrSuccessorInGraph(graph,patch);
      if (sucItem != null)
         patch = sucItem;
      addPatch(graph, patch, goal);
   }
   // Retry a goal (the reason), by looking for the patch or a successor
   // in the graph. If one exists, use it to resolve the goal. This can
   // occur if the successor is pulled in during dependency resoloution
   // when the patch is not the recommended/best resolution to the goal.
   private void retry(graph, reason, patch)
   {
      // see if a patch or successor is already in the graph
      Patch sucItem = itemOrSuccessorInGraph(graph,patch);
      if (sucItem != null) {
         // tie this reason with the resolution
         graph.addLink(sucItem,reason);
      }
   }
   // Determine if any unresolved goals have actually been solved.
This can happen
   // when a pulled in dependency resolves the issue.
   private void retryUnresolvedGoals(graph, system)
   {
      Vector goals = graph.getAllUnresolvedGoals( );
      for each goal in goals {
         // Handle all the Exact goals
         if (goal instanceof ExactGoal) {
            patch = goal.getPatch( );
            retry(graph,goal,patch);
         }
         if (goal instanceof RequiredMinGoal) {
            patch = goal.getPatch( );
            retry(graph,goal,patch);
         }
         if (goal instanceof RequestedMinGoal) {
            patch = goal.getPatch( );
            retry(graph,goal,patch);
         }
         if (goal instanceof RequestedReplaceGoal) {
            // get the successor
            patch = goal.getPatch( );
            patch = patch.getReplacement( );
               if (patch != null)
                  retry(graph,goal,patch);
         }
      }
   }
   // Resolve all dependencies for all patches in the graph. Use the
   // patches already installed on the system to resolve dependencies
   if possible.
   private void resolvePatchDependencies(graph, system)
   {
      // Create a linked list of all patches in the graph which need to be
      dependency checked.
      LinkedList to_be_dep_checked = locateAllPatches(graph);
      while (!to_be_dep_checked.isEmpty( )) {
         // pop the first item off the list.
         Patch patch = to_be_dep_checked.removeFirst( );
         // if the graph no longer contains the item skip it
         if (! graph.contains(patch))
            continue;
```

```
            // determine all of the dependencies
            Vector patch_deps = patch.getDependencies(contextId);
            for dependent in patch_deps {
                // skip this dependent if the patch or a successor is
                installed on the system
                if (patchOrSuccessorInstalled(dependent, system);
                    continue;
                // see if this dependent or one of its successor is in the
                GRAPH, if so, use it.
                Patch sucItem = itemOrSuccessorInGraph(graph,dependent);
                if (sucItem != null) {
                    graph.addLink(sucItem,patch);
                    continue;
                }
                // add the best version of the successor to the graph.
                dependent = locateBestVersion(dependent);
                // add the dependent
                addPatch(graph,dependent,patch);
                // schedule to check dependents of the newly added patch
                to_be_dep_checked.addLast(dependent);
            }
        }
        // Solve all goals in the graph by attaching the recommended patches
        and their dependents.
        public solveAllGoals(graph, system)
        {
            // fetch all goals from the graph
            Vector goals = locateAllGoals(graph);
            // process exact goals in GRAPH, handle exact goals first.
            for goal in goals {
                // Handle all the Exact goals
                if (goal instanceof ExactGoal)
                    processExactGoal(graph, system, goal);
            }
            // process the required min goals next
            for goal in goals {
                if (goal instanceof RequiredMinGoal)
                    processRequiredMinGoal(graph, system, goal);
            }
            // process the requested goals next
            for goal in goals {
                if (goal instanceof RequestedMinGoal)
                    processRequestedMinGoal(graph, system, goal);
                if (goal instanceof RequestedReplaceGoal)
                    processRequestedReplaceGoal(graph, system, goal);
            }
            // pull in the dependencies
            resolvePatchDependencies(graph, system);
            // reattach any goals resolve by dependents
            retryUnresolvedGoals(graph, system);
        }
        // create a goal appropriate for the identified issue
        public Goal createGoal(issue)
        {
            if (issue instanceof MissingExplicitPatch)
                return new ExactGoal(issue.getPatch( ));
            else if (issue instanceof CandidateNotInstalled)
                return new ExactGoal(issue.getPatch( ));
            else if (issue instanceof InstalledHasSuperseded)
                return new ExactGoal(issue.getPatch( ));
            else if (issue instanceof InstalledMissingPatchFromSet)
                return new ExactGoal(issue.getPatch( ));
            else if (issue instanceof InstalledHasWarning)
                return new RequestedReplaceGoal(issue.getPatch( ));
            else if (issue instanceof InstalledMissingCriticalPatch)
                return new RequestedMinGoal(issue.getPatch( ));
            else if (issue instanceof InstalledMissingDependentIssue)
                return new RequiredMinGoal(issue.getMissingPatch( ));
            else if (issue instanceof InstalledMissingSecurityPatch)
                return new RequiredMinGoal(issue.getMissingPatch( ));
            else
                return null;
        }
        // Create a graph containing the issues, and the goals and
        // the recommended patches which resolve the issues.
        public Graph resolveIssues(issues, system)
        {
            Graph graph = new Graph( );
            for issue in issues {
                // add the issue to the graph
                graph.addObject(issue);
                // create the goal for this issue
                Goal goal = createGoal(issue);
                if (goal != null) {
                    // add the goal for this issue
                    graph.addObject(goal);
                    // link goal to the issue
                    graph.addLink(goal,issue);
                }
            }
            solveAllGoals(graph,system);
            return graph;
        }
```

What is claimed is:

1. A method of selecting patches having patch attributes and successor patch relationships among a set of patches to recommend one or more patches for installation on a computer system comprising:

selecting one or more patch analyzer programs from a collection of such programs;

executing each selected patch analyzer program to analyze the set of patches in comparison to the computer system and the patch attributes containing information associated with the set of patches, causing each selected patch analyzer program to generate one or more issues associated with patch installation by processing the set of patches to identify one or more patches compatible with the selected patch analyzer program from the set of patches and with the computer system's installed operating system, programs, and patches;

identifying goals to resolve one or more of the issues through the installation of at least one of the identified one or more patches or a successor to the one or more patches based on the one or more patches, the one or more issues, and patch dependencies; and generating mutually consistent patch installation recommendations from the identification of the goals that satisfy as many goals as possible and that satisfy the patch dependencies of the one or more patches on the prior installation of other patches, based on patch attributes and successor patch relationships among the patches, each recommendation including a coordinated set of proposals to a user to install the one or more patches to achieve a given subset of the goals while satisfying the patch dependencies.

2. A method in accordance with claim 1 wherein at least one goal specifies that a successor to a specified patch is to be recommended for installation.

3. A method in accordance with claim 2 wherein at least one goal which specifies that a successor to a specified patch is to be recommended for installation also specifies that no patch is to be recommended for installation whose attributes include a warning.

4. A method in accordance with claim 1 wherein at least one goal specifies that a specific patch or a successor of the specific patch is to be recommended for installation.

5. A method in accordance with claim 4 wherein at least one goal which specifies that a specific patch or a successor to the specific patch is to be recommended for installation further specifies that no patch is to be recommended for installation whose attributes include a warning.

6. A method in accordance with claim 1 wherein at least one goal specifies that a specific patch is to be recommended for installation.

7. A method in accordance with claim 6 wherein at least one goal which specifies that a specific patch is to be recommended for installation further specifies that no patch whose attributes include a warning is to be recommended for installation.

8. A method in accordance with claim 1 wherein at least one goal which calls for the installation of a specific patch further requires any patch recommended for installation to have one or more specified patch attributes.

9. A method in accordance with claim 8 wherein at least one goal which requires one or more specified patch attributes specifically requires the absence of any warning attribute associated with any patch recommended for installation.

10. A method in accordance with claim 1 wherein generating mutually consistent patch installation recommendations further comprises avoiding recommending multiple patches from a set of predecessor and successor patches forming a patch tree by substituting successor patches for predecessor patches until the smallest practicable number of differing patches from the patch tree remain in the patch installation recommendations.

11. A method in accordance with claim 1 wherein generating mutually consistent patch installation recommendations further comprises finding and removing from the mutually consistent patch installation recommendations as many predecessors of any patches recommended to satisfy patch dependencies as is practicable.

12. A method in accordance with claim 1 which further comprises:
generating a patch disposition report that explains, for each patch processed by each patch analyzer program, the patch's disposition as well as what issues or goals, if any, the identifying step gave rise to for that patch.

13. A method in accordance with claim 12 wherein the patch disposition report generated further explains, for each patch the disposition report associates with an issue or goal, what specific patch installation recommendations the generating recommendations step gave rise to with respect to that issue or goal, if any.

14. A method in accordance with claim 13 which further comprises:
sorting the patch disposition report to list together as a set information relating to all patches processed by a given analyzer program and, within such a set, to list together as subsets information relating to all patches disposed of in the same manner.

15. A method in accordance with claim 1 which further comprises re-executing each selected program this time to generate, for each processed patch, a one-patch portion of a patch disposition report explaining what issues or goals, if any, the identifying step gave rise to for that patch.

16. A method in accordance with claim 15 which further comprises augmenting the one-patch portions of a patch disposition report with information taken from the patch installation recommendations indicating how each issue or goal was satisfied by specific patch installation recommendations.

17. A method in accordance with claim 16 which further comprises:
sorting the patch disposition report to list together as a set information relating to all patches processed by a given analyzer program and, within such a set, to list together as subsets information relating to all patches disposed of in the same manner.

18. A system written on memory comprising a set of instructions which, when executed, instruct a processor to implement the system, the system to select patches to recommend for installation on a computer system comprising:
a patch tree database containing patches having attributes including information associated with the patches and organized into patch trees by successor relationships among the patches;
a collection of patch analyzer programs;
a collection program to gather installed operating system, program, and patch information from a computer system;
an assessment configuration system that enables a user to select a set of one or more of the analyzer programs;
a patch analysis and issue generator to cause each selected analyzer program to generate issues to be addressed by patch installation by processing a set of patches taken from the patch tree database and compatible with the selected analyzer program and with the computer system's installed operating system, programs, and patches as identified by the collection program;
a goal generator to identify, for as many issues as possible, goals that call for the installation of one or more of the set of patches or one or more successors to the set of patches; and
a recommendations generator to generate mutually consistent patch installation recommendations from the identification of the goals which satisfy as many of the goals as possible and which satisfy patch dependencies of the patches in the set upon the prior installation of other patches based on the patch attributes and successor patch relationships, each recommendation including a coordinated set of proposals to the user to install one or more patches in the set to achieve a given subset of the goals while satisfying the patch dependencies.

19. A system in accordance with claim 18 wherein the goal generator is to generate a goal that specifies a successor of a specified patch is to be recommended for installation.

20. A system in accordance with claim 19 wherein the goal generator is to generate a goal that, in addition to specifying that a successor of a specified patch is to be recommended for installation, also specifies that no patch is to be recommended for installation whose attributes include a warning.

21. A system in accordance with claim 18 wherein the goal generator is to generate a goal that specifies a specific patch or a successor of the specific patch is to be recommended for installation.

22. A system in accordance with claim 21 wherein the goal generator is to be generate a goal that, in addition to specifying a specific patch or a successor of the specific patch is to be recommended for installation, further specifies that no patch is to be recommended for installation whose attributes include a warning.

23. A system in accordance with claim 18 wherein the goal generator is to generate a goal that specifies a specific patch is to be recommended for installation.

24. A system in accordance with claim 23 wherein the goal generator is to generate a goal that, in addition to specifying a specific patch is to be recommended for installation, further specifies that no patch whose attributes include a warning is to be recommended for installation.

25. A system in accordance with claim 18 wherein the goal generator is to generate a goal that, in addition to identifying a specific patch, further requires any patch recommended for installation to have one or more specified patch attributes.

26. A system in accordance with claim 18 wherein the goal generator is to generate a goal that, in addition to identifying a specific patch, further requires the absence of any warning attribute associated with any patch recommended for installation.

27. A system in accordance with claim 18 wherein the recommendations generator avoids recommending multiple patches from a set of predecessor and successor patches forming a patch tree by substituting successor patches for predecessor patches in the recommendations until the smallest practicable number of differing patches from the same patch tree remain in the recommendations.

28. A system in accordance with claim 18 wherein the recommendations generator finds and removes from the recommendations as many predecessors of any patches recommended to satisfy patch dependencies as is practicable.

29. A system in accordance with claim 18 which further comprises:
a patch disposition report generator that produces a report which explains, for each patch processed by each patch analyzer program, the patch's disposition as well as what issues or goals, if any, the goal generator gave rise to for that patch.

30. A system in accordance with claim 29 wherein the patch disposition report generator's report further explains, for each patch the report associates with an issue or goal, what specific patch installation recommendations the recommendations generator gave rise to with respect to that issue or goal, if any.

31. A system in accordance with claim 30 wherein the patch disposition report generator further comprises:
a sorting system that sorts the patch disposition report to list together as sets information relating to all patches processed by a given analyzer program and, within such sets, to list together as subsets information relating to all patches disposed of in the same or in a similar manner.

32. A system in accordance with claim 18 which further comprises:
a patch disposition report generator that re-executes each selected analyzer program to generate, for each processed path, a one-patch portion of a patch disposition report explaining what issues or goals, if any, the goal generator gave rise to for that patch.

33. A system in accordance with claim 32 wherein the patch disposition report generator arguments the one-patch portion of a patch disposition report with information taken from the patch installation recommendations indicating how each issue or goal satisfied by specific patch installation recommendations.

34. A system in accordance with claim 33 wherein the patch disposition report generator further comprises:
a sorting system that sorts the patch disposition report to list together as sets information relating to all patches processed by a given analyzer program and, within such sets, to list together as subsets information relating to all patches disposed of in the same or in a similar manner.

35. A system written on memory to select patches to recommend for installation on a computer system comprising:
patch tree database means for storing patches having attributes including information associated with the patches and organized into patch trees by successor patch relationships among the patches;
a collection of patch analyzer program means for analyzing the patches to identify issues associated with patch installation;
collection program means for gathering installed operating system, program, and patch information from the computer system;
assessment configuration means for enabling a user to select a set of one or more of the patch analyzer program means;
patch analysis and issue generation means for causing each selected analyzer program means to generate the issues by processing a set of patches taken from the patch tree database means and compatible with the selected analyzer program means and with the computer system's installed operating system, programs, and patches as identified by the collection program means;
goal generation means for identifying, for as many issues as possible, goals that call for the installation of the patches in the set or one or more successors to the set of patches; and
recommendations generation means for generating mutually consistent patch installation recommendations from the identification of the goals which satisfy as many goals as possible and which satisfy patch dependencies of the patches in the set upon the prior installation of other patches based on the patch attributes and successor patch relationships, each recommendation including a coordinated set of proposals to the user to install one or more patches in the set to achieve a given subset of the goals while satisfying the patch dependencies.

36. A system in accordance with claim 35 which further comprises:
patch disposition report generator means for producing a report which explains, for each patch processed by each patch analyzer program means, the patch's disposition as well as what issues or goals, if any, the goal generation means gave rise to for that patch, and which report further explains, for each patch the report associates with an issue or goal, what specific patch installation recommendations the recommendations generating means gave rise to with respect to that issue or goal, if any.

* * * * *

UNITED STATES PATENT AND TRADEMARK OFFICE
CERTIFICATE OF CORRECTION

PATENT NO. : 7,765,538 B2
APPLICATION NO. : 10/977694
DATED : July 27, 2010
INVENTOR(S) : Evan Rudolph Zweifel et al.

Page 1 of 1

It is certified that error appears in the above-identified patent and that said Letters Patent is hereby corrected as shown below:

In column 28, line 49, in Claim 22, after "is to" delete "be".

In column 29, line 39, in Claim 32, delete "path," and insert -- patch, --, therefor.

In column 29, line 43, in Claim 33, delete "arguments" and insert -- augments --, therefor.

In column 29, line 44, in Claim 33, delete "portion" and insert -- portions --, therefor.

In column 29, line 46, in Claim 33, after "goal" insert -- was --.

Signed and Sealed this
Twenty-ninth Day of March, 2011

David J. Kappos
*Director of the United States Patent and Trademark Office*